United States Patent
Lehtiniemi et al.

(10) Patent No.: US 9,418,346 B2
(45) Date of Patent: Aug. 16, 2016

(54) METHOD AND APPARATUS FOR PROVIDING A DRAWER-BASED USER INTERFACE FOR CONTENT ACCESS OR RECOMMENDATION

(71) Applicant: Nokia Corporation, Espoo (FI)

(72) Inventors: Arto Juhani Lehtiniemi, Lempaala (FI); Antti Johannes Eronen, Tampere (FI); Juha Henrik Arrasvuori, Tampere (FI); Jukka Antero Holm, Tampere (FI)

(73) Assignee: Nokia Technologies Oy, Espoo (FI)

( * ) Notice: Subject to any disclaimer, the term of this patent is extended or adjusted under 35 U.S.C. 154(b) by 504 days.

(21) Appl. No.: 13/852,646

(22) Filed: Mar. 28, 2013

(65) Prior Publication Data

US 2014/0298217 A1    Oct. 2, 2014

(51) Int. Cl.
*G06F 3/0481* (2013.01)
*G06Q 10/06* (2012.01)

(52) U.S. Cl.
CPC .................................... *G06Q 10/06* (2013.01)

(58) Field of Classification Search
None
See application file for complete search history.

(56) References Cited

U.S. PATENT DOCUMENTS

| | | | | |
|---|---|---|---|---|
| 5,751,287 | A * | 5/1998 | Hahn et al. | 715/775 |
| 8,233,008 | B2 * | 7/2012 | Jin | G06T 19/20 345/619 |
| 9,041,860 | B2 * | 5/2015 | Buchheit | H04N 21/242 348/500 |
| 9,161,075 | B2 * | 10/2015 | Conley | H04L 21/00 |
| 9,185,332 | B2 * | 11/2015 | Kunkel | H04N 5/76 |
| 2002/0198906 | A1 | 12/2002 | Press | |
| 2006/0010150 | A1 * | 1/2006 | Shaath | G06F 17/30085 |
| 2007/0149115 | A1 * | 6/2007 | White | G06Q 30/0267 455/3.06 |
| 2007/0240190 | A1 * | 10/2007 | Arseneau | H04L 29/06027 725/81 |
| 2009/0049045 | A1 * | 2/2009 | Askey et al. | 707/7 |
| 2010/0203833 | A1 * | 8/2010 | Dorsey | G06F 17/30035 455/41.2 |
| 2011/0060998 | A1 * | 3/2011 | Schwartz | G06F 17/30873 715/738 |
| 2011/0138307 | A1 * | 6/2011 | Eizadi | G06F 17/30867 715/760 |
| 2011/0314388 | A1 * | 12/2011 | Wheatley | G11B 27/034 715/751 |
| 2012/0278740 | A1 | 11/2012 | Robinson et al. | |
| 2013/0174087 | A1 * | 7/2013 | Chen et al. | 715/800 |
| 2013/0254308 | A1 * | 9/2013 | Rose | H04N 7/17318 709/206 |
| 2014/0063174 | A1 * | 3/2014 | Junuzovic | G06Q 10/101 348/14.02 |
| 2014/0108946 | A1 * | 4/2014 | Olofsson | G06Q 50/01 715/739 |

FOREIGN PATENT DOCUMENTS

EP    2 175 238 A2    4/2010

OTHER PUBLICATIONS

M.F. Costabile, et al., "Building Metaphors for Supporting User Interaction with Multimedia Databases," Universita degli Studi di Bari Via Orabona 4,I-70126, Bari, Italy, pp. 1-19.
J. Frank, et al., "Ambient Music Experience in Real and Virtual Worlds Using Audio Similarity," Vienna University of Technology, Published on Oct. 31, 2008, pp. 1-8.

* cited by examiner

*Primary Examiner* — Tuan S Nguyen
(74) *Attorney, Agent, or Firm* — Ditthavong & Steiner, P.C.

(57) ABSTRACT

An approach is provided for causing, at least in part, a generation of at least one representation of at least one building, wherein one or more floors of the at least one building are represented as one or more drawer user interface elements in the at least one representation. The approach also involves causing, at least in part, an association of one or more content items with the one or more drawer user interface elements, wherein one or more user interactions with the one or more drawer user interface elements causes, at least in part, an initiation of one or more operations on the one or more content items.

20 Claims, 15 Drawing Sheets

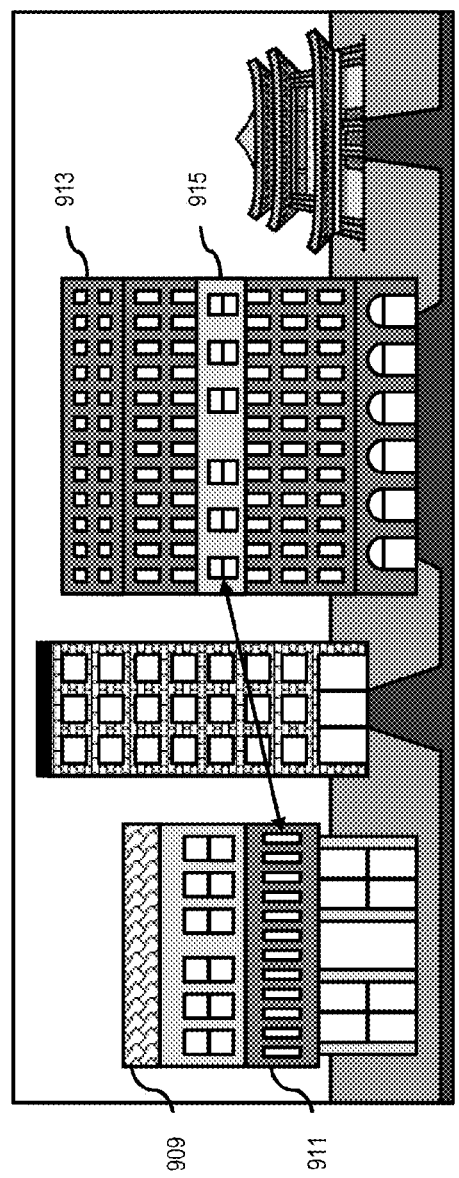
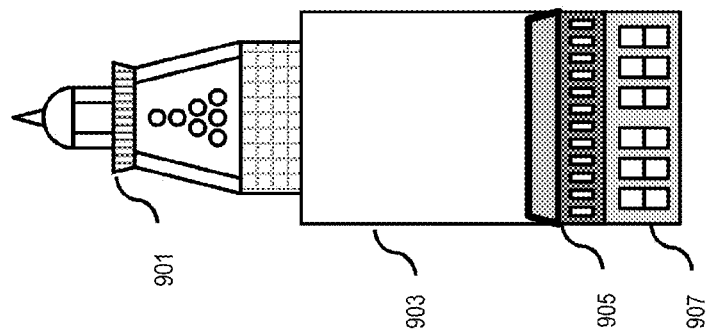
FIG. 9B
FIG. 9A

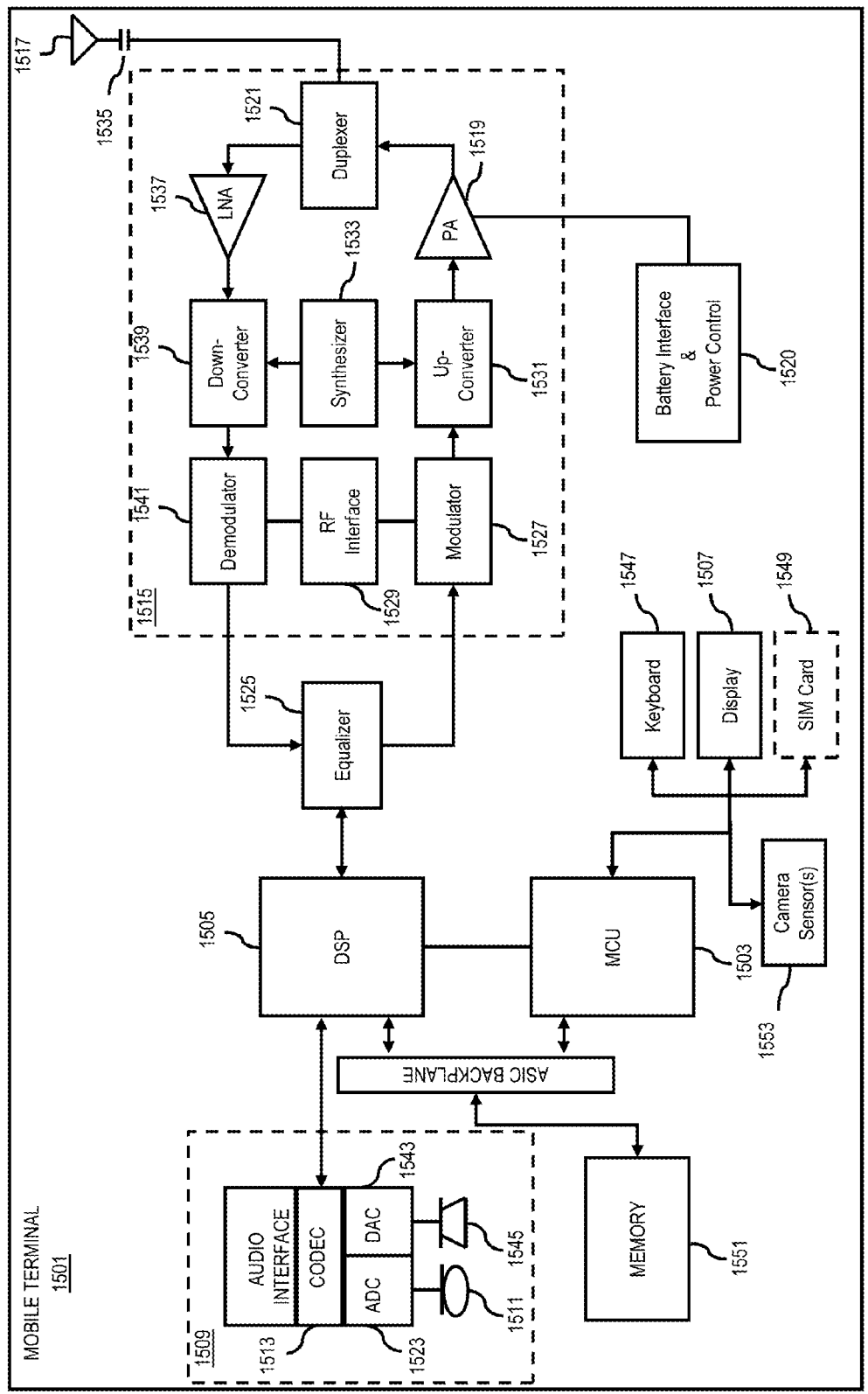

METHOD AND APPARATUS FOR PROVIDING A DRAWER-BASED USER INTERFACE FOR CONTENT ACCESS OR RECOMMENDATION

BACKGROUND

Service providers and device manufacturers (e.g., wireless, cellular, etc.) are continually challenged to deliver value and convenience to consumers by, for example, providing compelling network services. One area of development has been related to content consumption and creation, which has resulted in tremendous growth in the amount of content (e.g., music, video, electronic books, etc.) available to users. This growth, in turn, can make it difficult for a user to sift through available content and find content of specific interest. At the same time, augmented reality and mixed reality applications that allow users to see a view of the physical world merged with virtual objects in real time have also grown in popularity. As a result, service providers and device manufacturers face significant technical challenges to enabling new user interfaces and experiences for content discovery, recommendation, and access while leveraging unique aspects of location-based applications such as augmented and mixed reality applications.

SOME EXAMPLE EMBODIMENTS

Therefore, there is a need for an approach for providing a drawer-based user interface for content access or recommendation.

According to one embodiment, a method comprises causing, at least in part, a generation of at least one representation of at least one building, wherein one or more floors of the at least one building are represented as one or more drawer user interface elements in the at least one representation. The method also comprises causing, at least in part, an association of one or more content items with the one or more drawer user interface elements, wherein one or more user interactions with the one or more drawer user interface elements causes, at least in part, an initiation of one or more operations on the one or more content items.

According to another embodiment, an apparatus comprises at least one processor, and at least one memory including computer program code for one or more computer programs, the at least one memory and the computer program code configured to, with the at least one processor, cause, at least in part, the apparatus to causing, at least in part, a generation of at least one representation of at least one building, wherein one or more floors of the at least one building are represented as one or more drawer user interface elements in the at least one representation. The method also comprises causing, at least in part, an association of one or more content items with the one or more drawer user interface elements, wherein one or more user interactions with the one or more drawer user interface elements causes, at least in part, an initiation of one or more operations on the one or more content items.

According to another embodiment, a computer-readable storage medium carries one or more sequences of one or more instructions which, when executed by one or more processors, cause, at least in part, an apparatus to causing, at least in part, a generation of at least one representation of at least one building, wherein one or more floors of the at least one building are represented as one or more drawer user interface elements in the at least one representation. The method also comprises causing, at least in part, an association of one or more content items with the one or more drawer user interface elements, wherein one or more user interactions with the one or more drawer user interface elements causes, at least in part, an initiation of one or more operations on the one or more content items.

According to another embodiment, an apparatus comprises means for causing, at least in part, a generation of at least one representation of at least one building, wherein one or more floors of the at least one building are represented as one or more drawer user interface elements in the at least one representation. The method also comprises causing, at least in part, an association of one or more content items with the one or more drawer user interface elements, wherein one or more user interactions with the one or more drawer user interface elements causes, at least in part, an initiation of one or more operations on the one or more content items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10, 21-30, and 46-48.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 7A, 7B, 8, 9A, 9B, 10, 11, and 12 are diagrams of user interfaces utilized in the processes of FIG. 3-6, according to various embodiments;

FIG. 15 is a diagram of a mobile terminal (e.g., handset) that can be used to implement an embodiment of the invention.

DESCRIPTION OF SOME EMBODIMENTS

Examples of a method, apparatus, and computer program for providing a drawer-based user interface for content access or recommendation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known buildings and devices are shown in block diagram form in order to avoid unnecessarily obscuring the embodiments of the invention.

Figure 1:
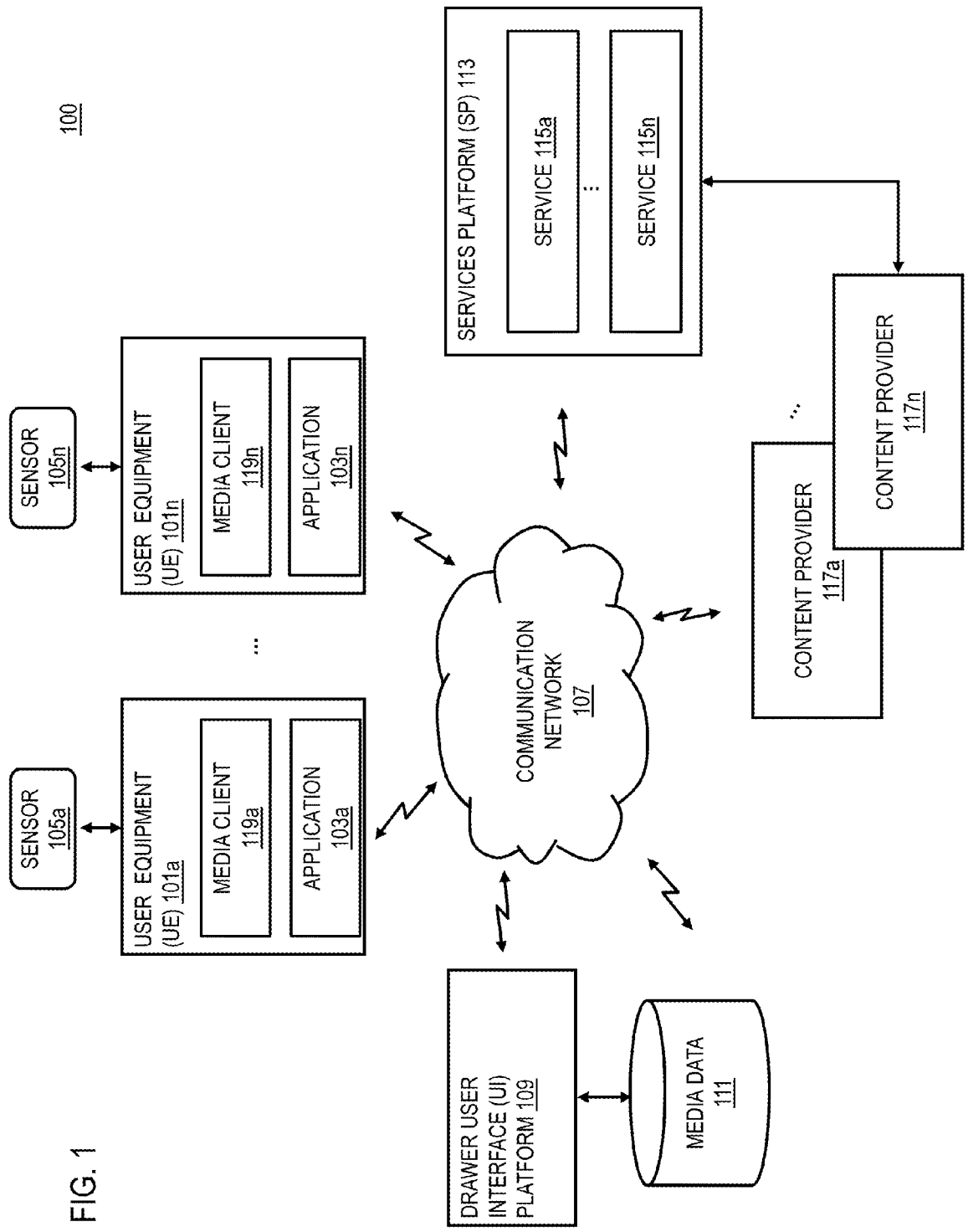
FIG. 1 is a diagram of a system capable of providing a drawer-based user interface for content access or recommendation according to one embodiment.

FIG. 1 is a diagram of a system capable of providing a drawer-based user interface for content access or recommendation, according to one embodiment. Today's mobile capabilities allow for most forms of downloadable content for purchase with only the push of a button. Due in part to the ease of purchasing such products, the amount of consumer content has increased substantially over the past several years; however, a new challenge to consumers is the exceedingly growing number of options, making it difficult to discover new content that reflects the consumers' tastes. Additionally, with all of these options, the process of filtering undesirable products can quickly become a dull, inefficient and daunting chore.

Current media (music, ebooks, movies, etc.) services may provide an excellent selection of products for the consumer, but such offerings need improvement in two areas: (i) reliable recommendations and (ii) user experience. It is generally difficult for a user to discover a good selection of new content that would be suited to his tastes. Most of the featured artists or songs in these services are made up of a relatively small and mostly established group of artists. Thus, it is difficult for a user to discover newer, untested artists and songs (outside of the handful of prescreened featured new artists), especially if his preferences do not appeal to the mainstream audience. Also, the extent of the user interface and interactions current music services boast are centered on texts and lists (top ten lists, typing in a search query and receiving a list of results, etc.). User interfaces mainly consists of lists of songs (or even album cover images) and user interactions are generally limited to clicking on selections one-by-one to hear a sample. Thus, such services can lack in the areas of graphical appeal and overall experience. Users may find that the difficulty and effort required to find new music may be too taxing on their time and energy to be worth their while.

To address this problem, a system 100 of FIG. 1 introduces the capability of a drawer-based user interface for content access or recommendation by providing a user interface that supports user interactions that mimic pulling out virtual floors (acting like drawers) from virtual buildings to discover, recommend, receive recommendations, or otherwise access the content items. Users may access music listened to in the real world in virtual 3D worlds by viewing, modifying, and changing floors from different buildings. There are different types of buildings related interactions proposed in this invention. The core idea is the interaction that the user is able to pull out floors from buildings as drawers and see or interact with the musical content consumed there in novel ways. This invention is implemented as a user interface (UI) to a music service. The changes done in the 3D environment can reflect back to the real world as music recommendations. The users are able to populate their own building frames with favorite drawers and these can be shared as playlists for other people. Therefore, system 100 may generate at least one representation of a building, where floors of the building are represented as a drawer UI element. The system 100 may cause an association of one or more content items with the drawer UI elements. When the user interacts with a drawer UI element, this interaction may cause an initiation of one or more operations of the content items therein.

According to one embodiment, every user has their own empty building frame that has multiple "floors" (FIG. 9A). System 100 creates the representation of a building, which would include a building frame that is initially configured without the drawer UI elements. The user is able to open drawers from buildings to access music and move favorite drawers as floors of his building frame (e.g. to create a playlist or influence a playlist with a type of content). According to one embodiment, drawers of buildings can contain music listened on that floor, most popular songs on that floor, playlists on that floor, or just one song based on the filtering options. In the case of one floor containing only one song, the whole building can represent a playlist. The user may change the order of the playlist by swapping floors in different order. Floors can also be swapped between buildings to mix & match music or influence a playlist with a different type of music (i.e. use as a seed for music recommendations). See the FIG. 9B. Thus, system 100 may cause a presentation of a drawer adapter UI element with the representation of the building, where the drawer adapter UI element may enable a configuration of the drawer UI element with the building, other drawer UI elements, or a combination thereof. System 100 may determine that the user interaction associated with a moving of the drawer UI element (1) within the representation; (2) between the representation and another representation of a building; or (3) a combination thereof and cause a rearrangement of the content items based, at least in part, on the user interaction.

Actions and modifications in the 3D world can be personal or shared with other virtual world viewers. The content items are the content items consumed by the users associated with the floors represented by the drawer UI elements. The drawer may contain a music playlist as in FIG. 8. The song closest to the user (when opening the drawer) is played first. Thus, system 100 may determine a particular user interaction is associated with an opening of the drawer UI element and cause a presentation of the other representations of the content items associated with the opened drawer UI element.

A servicer may offer adapter components for the drawers. Adapters may allow certain users greater flexibility and controls over the UI and playback options. For example, an adapter may allow any drawer from any building can be swapped with another drawer. With a "twin" adapter, two drawers from two different buildings can be placed into the same floor of a third building, thus creating a new mix of the drawers' contents. See FIG. 9B. Wherein the configuration, drawer interaction or a combination thereof are associated with (1) creating a playback order for the one or more content items, (2) determining one or more transitions between a playback of the one or more content items, (3) determining a parametric evolution for a playback of the one or more content items, (4) causing a union of the one or more content items, (5) determining an intersection of the one or more content items, (6) causing a selection of the one or more content items based, at least in part, on a stylistic criterion, (7) causing an arrangement of the one or more content items based, at least in part, on a stylistic criterion, or a (8) combination thereof. Certain users may also have access to drawers of different heights that hold more content than ordinary drawers. There may be an exclusive penthouse floor drawer, that only user can have at a time. Some drawers may be sponsored. In other words, users are granted free access to the music represented by the drawers displaying the logo of the sponsoring company. See FIG. 11.

According to one embodiment, users are able to interact with the content in various ways. Users may add new types of songs to the drawer by putting the song files in the drawer (users physically located in the building will receive these files as recommendations) and influence the playlist (or drawer) by pouring content from a specific genre into the drawer. System 100 may determine that the user interaction is for specifying other content items to add to the drawer UI element and cause a recommendation of the other items to the users associated with the floors represented by the drawer UI element. A user may modify the appearance of the drawer (pouring blue paint on the drawer) in order to obtain cover versions of the drawers' songs in the style defined through the modification (blues versions of the songs). System 100 may determine that the user interaction is for causing a modification of appearance characteristics of the drawer UI element and determine the operations to initiate on the content items based on the modification. A user may change building textures; and playing music immediately upon a user opening a drawer (when multiple drawers are opened, the system 100 can generate a mix of those songs or create a playlist of that material). The system 100 may determine outlines, textures, or a combination thereof of the representation based on the user interactions, operations, or a combination thereof.

In one embodiment, the user is further able to see the different rooms in the drawer/floor which was pulled out. Different rooms may correspond to different albums or songs, for example, if the floor corresponded to an album, musical genre or the production of an artist. The user may be further able to change the playback order of songs in the drawer by modifying the floorplan (changing the ordering/arrangement/layout of the rooms).

In one embodiment, a building floor corresponds to an artist/album/genre, and the different rooms in the floor correspond to listeners of that artist/album/genre. That is, each listener has his "own room", and the contents of the room, such as furniture/appearance/etc. correspond to other music content consumed (listened to) by the listeners. The user who pulled out the drawer may further create playlists by interacting with objects in one or more rooms of the other users of the service. For example, the user may decide to create a playlist corresponding to the carpets or TV sets of each user. To enable meaningful associations of songs to room objects, the songs may be associated according to listening situation. As an example, relaxing music listened by each user may be associated to the bed, party music to a disco ball in the ceiling, background music to the carpet, jogging music to a bicycle standing by the wall, and music currently or lastly consumed by each user to the TV set. Such associations between music pieces and listening situations may be inputted by the users themselves, e.g., via tagging music with consumption related tags such as "relaxing", harvested or collected from online information sources or data providers, or collected via automatic music scrobbling where the client submits information on songs played and the situation during the content rendering, such as "at home" or "bicycling".

The invention is implemented as software running on a backend service (the music service) and a client device (PC, tablet, mobile phone). The client device renders the user interface (the building graphics, for example), renders the music, and communicates with the server. The client/server communication comprises, for example, coordinates/identifiers of sections of buildings interacted with, and actions done with them. The server returns the media associated with the interacted sections of buildings, creates the playlists, or causes the recommendation of media to other users of the service.

System 100 is an exemplary embodiment of providing a drawer-based user interface for content access or recommendation. According to one embodiment, an example operation flow in the invention starts with a user interacting with a graphical representation of a building floor as displayed in applications 103a-103n (collectively referred to applications 103). For example, the user pulls the floor away from the building like a drawer. The interaction can be performed on the user equipment 101a-100n (collectively referred to as user equipment 101). The client communicates via communication network 107 to the services platform 113 the coordinates/identifier of the interacted floor as discovered by sensors 105. The services platform 113 responds with information (artist/album/title/referred as basic song metadata and/or cover art) of content corresponding to the interacted floor through accessing the data stored in content provider 117a-117n (collectively referred to as content providers 117). The services platform 113 renders the information of the content on the modified representation of the building floor. As a result, the user sees the album cover art and/or basic metadata of the content corresponding to the structure in the UE 101. Correspondingly, when the user moves a floor from a building to his own building, the sensors 105 communicates to the service 115 and drawer user interface (UI) platform or the media clients 119 the action via communication network 107. If this information is sent to the drawer UI platform 109, it will be processed in the network platform or in the cloud. If this information is sent to the media client 119, the processing may occur locally within the UE 101. The drawer UI platform 109 or the media clients 119 update a playlist data structure corresponding to the user's own building, makes the playlist available for consumption, and the drawer UI platform 109 may store a copy in the media data 111 while the media client 119 may store the content locally in the UE 101's local storage. The user may interact with the graphic user interface (GUI) building in his UE 101 to start playback on the playlist.

In one embodiment, the system 100 applies augmented reality (AR) and mixed reality (MR) services and applications to visually connect (allow a user device to graphically display the MR and AR UI while enabling user controls through interacting with the GUI) a user device to a location or building for accessing content items associated with the location or building. AR allows a GUI to show a user's view of the real world overlaid with additional visual information. MR allows for the merging of real and virtual worlds to produce visualizations and new environments. In MR, physical and digital objects can co-exist and interact in real time. Thus, MR can be a mix of reality, AR, virtual reality, or a combination thereof. Such applications allows for the association of one or more media profiles to a location, or to one or more buildings (e.g., buildings) in the location, wherein the building in a virtual world may be presented as a two dimensional (2D) or three dimensional (3D) object. The one or more media profiles may be shared with other users. The media profile owner can be a user, a company, an advertiser, etc., and they may need approval of the building owner or associated user profile to tag the media profiles thereon.

In one embodiment, the system 100 renders a GUI element in the form of a building. The building's various floors represent groups of storage for content items in the form of drawers (e.g., Kim's "Oldies Playlist" appears when a drawer in a building is opened and Brian's "Recent Purchases Playlist" appears when a different drawer is opened). In addition, the system 100 renders at least one input connection component (e.g., an input icon/tap in a GUI of a user device), at least one output connection component (e.g., an output icon/tap in the GUI element in the POI representation) for interacting with the user interface element rendered in the building, the media profile, or a combination thereof. The building representation may be a portion of a pre-recorded or live panoramic image, a portion of a pre-recorded or live camera view, etc. By manipulating the input icon/tap and the output icon/tap on the GUIs, the user can download/upload the content items (e.g., one or more songs/movies in Kim's playlist, etc.) to the user device, rendering the content items at the user device, and rendering the content items with thematic effects related to the building.

In one embodiment, a three dimensional (3D) perspective can be utilized that makes the drawer to become part of the view instead of an overlay of it. In this manner, the drawer can be integrated with a surface (e.g., a building facade) of the building. To present such a GUI, one or more user equipment (UEs) 101*a*-101*n* can retrieve drawers associated with a building. The UEs 101*a*-101*n* can then retrieve a model of the building and cause rendering of the drawers or content items based on features of one or more surfaces of the building in the GUI. According to one embodiment, the invention is implemented as a GUI to a music service; music listened in the real world on those particular floors may be accessed in a virtual 3D world by viewing, modifying, and changing floors from different buildings. In this manner, a user may pull out floors from buildings as drawers and see and or interact with the musical content consumed there.

In one embodiment, user equipment 101 can present the GUI to users. In certain embodiments, the processing and/or rendering of the drawers or content items may occur on the UEs 101 in the media clients 119. In other embodiments, some or all of the processing may occur on one or more services platforms 113 that provide one or more media sharing services. In certain embodiments, a media sharing service provides a user interface for media sharing (e.g., media profiles, media information, entertainment, advertisement, etc.) on a building or in a drawer. The provided media may be associated with the geographical location of the building, position of the features of the building, orientation information of the UE 101, etc. The UEs 101 and the drawer UI platform 109 can communicate via a communication network 107. In certain embodiments, the drawer UI platform 109 may additionally include media data 111 that can include content items associated with particular buildings. This media data 111 can include media from one or more users of UEs 101 and/or commercial users generating the content. In one example, commercial and/or individual users can generate playlists of music popular in a certain geographic area by following specific paths or streets. These playlists may additionally be stitched together to generate larger, more comprehensive playlist representing popular music over a larger region. In certain embodiments, the media data 111 can be broken up into one or more databases.

As discussed previously, the 3D building model may be associated with certain buildings within the virtual environment that may or may not correspond to counterparts in the physical environment. In this way, the building may be selected to correspond with a local building. For example, a user may create a virtual building and place this virtual building in a virtual city provided by service 115 through a UE 101's application 103. Alternatively, a user may find a graphical representation of a real building on a real map. Drawer UI platform 109 (or media client 119) would allow the user to interactively manage his content items in either the real or virtual building.

The user may use one or more applications 103 (e.g., thematic effect applications, a map application, a location services application, a content service application, etc.,) on the UEs 101 to provide media associated with one or more features of a building to the user. The thematic effect applications may include a karaoke application, an augmented reality application, etc. In this manner, the user may activate an application 103. The application 103 can utilize a sensor 105 to provide location and/or orientation of the UE 101. In certain embodiments, one or more GPS satellites may be utilized in determining the location of the UE 101. Further, the sensors 105 may include an image capture module, which may include a digital camera or other means for generating real world images. These images can include one or more buildings (e.g., a building, tree, sign, car, truck, etc.). Further, these images can be presented to the user via the GUI. According to one embodiment, these images may be saved as content items in a user's drawer. The UE 101 can determine a location of the UE 101, an orientation of the UE 101, or a combination thereof to present the content and/or add additional content.

In some embodiments, the application 103 may present a heat map with highlighted popular buildings, drawers, regions, etc. This feature is a visual option that identifies to users current trends in service 115's database. By way of example, such heat maps enables users to quickly identify possible content items, playlists, drawers, or buildings of interest and are "buzzworthy".

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the sensors 105 may be any type of sensor. In certain embodiments, the sensors 105 may include, for example, a camera/imaging sensor for gathering image data, an audio recorder for gathering audio data, a global positioning sensor for gathering location data, a network detection sensor for detecting wireless signals or network data, temporal information and the like. In one scenario, the sensors 105 may include location sensors (e.g., GPS), light sensors, oriental sensors augmented with height sensor and acceleration sensor, tilt sensors, moisture sensors, pressure sensors, audio sensors (e.g., microphone), or receivers for different short-range communications (e.g., Bluetooth, WiFi, near field communication etc.). In one embodiment, the sensors may be the touch screen of a user equipment, such as a mobile handset.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the drawer UI platform 109 may be a platform with multiple interconnected components. The drawer UI platform 109 may include multiple servers, intelligent networking devices, computing devices, components and corresponding software for providing a drawer-based user interface for content access or recommendation. In addition, it is noted that the drawer UI platform 109 may be a separate entity of the system 100, a part of the one or more services 115 of the services platform 113, or included within the UE 101 (e.g., as part of the application 103).

In certain embodiments, the media profiles and/or buildings or their representing UI elements presented to the user via the GUI is filtered. Filtering may be advantageous if more than one drawer is associated with a building. Filtering can be based on one or more criteria determined by users, real estate owners, content providers, authorities, etc. Furthermore, policies may be enforced to associate hierarchical priorities to the filters so that for example some filters override other filters under certain conditions, always, in absence of certain conditions, or a combination thereof. One criterion can include user preferences, for example, a preference selecting types (e.g., text, video, audio, images, messages, etc.) of drawers to view or filter. Another criterion for filtering can include removing drawers or buildings from display by selecting the drawers or buildings for removal (e.g., by selecting the drawer or building via a touch enabled input and dragging to a waste basket). Moreover, the filtering criteria can be adaptive using an adaptive algorithm that changes behavior based on available drawers and information (metadata) associated with content items. For example, a starter set of information or criteria can be presented and based on the starter set, the UE 101 or the drawer UI platform 109 can determine other criteria based on the selected criteria. In a similar manner, the adaptive algorithm can take into account drawers or buildings removed from view on the GUI. Additionally or alternatively, precedence on viewing drawers that overlaps can be determined and stored with the building. For example, a drawer's content item may have the highest priority to be viewed because a user or a content provider may have paid for the priority. Then, criteria can be used to sort priorities of drawers to be presented to the user in a view. In certain embodiments, the user, the content provider, the real estate owner of a combination thereof may be provided with the option to filter the drawers based on time.

In one embodiment, the drawer UI platform 109 determines that a user is associated with at least one item. In one embodiment, the drawer UI platform 109 receives a notification from a user indicating that the user is associated with at least one item. In one embodiment, the drawer UI platform 109 has access to contextual information of a user, for instance, subsequent visits/searches by the user for one or more products and the like. In one scenario, the drawer UI platform 109 may process and associate one or more comments, ratings, rankings, quality information, user experience, and the like, from a user to determine the likelihood of user purchasing the item in future.

In various embodiments, some of the permissions associated with the drawers can be assigned by the user, for example, the user may select that the user's UE 101 is the only device allowed to receive the drawer content items. In this scenario, the content items may be stored on the user's UE 101 and/or as part of the media data 111 (e.g., by transmitting the media profiles to the drawer UI platform 109). Further, the permissions can be public, based on a key, a username and password authentication, based on whether the other users are part of a contact list of the user, or the like. In these scenarios, the UE 101 can transmit the drawers and media information to the drawer UI platform 109 for storing as part of the media data 111 or in another database associated with the media data 111. As such, the UE 101 can cause, at least in part, storage of the association of the drawers and the buildings. In certain embodiments, content items can be visual or audio information that can be created by the user or associated by the user to the drawer and/or building. A drawer may selectively include user profile data, scrobbling data, data of the building, some or all of media content associated with the scrobbling data, comments/reviews/ratings regarding the user, the media content, social network data related to the media consumption and/or the drawer/building, etc. The user profile data may include a user name, a photo, a date of registration, a total number of media tracks played, etc. The social network data related to the media consumption and/or the drawer/building can include lists of friends, friends' playlists, weekly musical fans, favorite tags, groups, events, etc. All other related information for providing the media server is refereed as media information.

Scrobbling data include users' media consumption data, such as a list of top artists and media tracks, the 10 most recently played media tracks, music-listening habits tracked over time via local software or internet services, as counted events when songs or albums are played. By way of example, a user can build a media profile by listening to a personal music collection on a music player application on a computer or a mobile device with a scrobbler plug-in, or by listening to an internet radio service. All songs played are added to a log from which personal top artist/track bar charts and musical recommendations are calculated.

In one embodiment, the drawer UI platform 109 may query one or more drawers associated with one or more buildings for the availability of the one or more content items upon receiving user requests. In one scenario, the drawer UI platform 109 may utilize various search term to conduct one or more searches for the one or more content items in the one or more storage repositories (e.g., media data 111), one or more content providers, one or more other service providers, and the like.

In one embodiment, the media data 111 may store content items of interest for specific users from the sensors 105, drawer UI platform 109, services platform 113 and/or content provider 117, for the user to access at a later date. In one embodiment, the media data 111 may store information on content items associated with the at least one building. In one embodiment, the drawer UI platform 109 may include and/or have access to the media data 111 to access and/or store information associated with the items of interest.

The content provider 117 may provide content to the UE 101, the drawer UI platform 109, and the services 115 of the services platform 113. The content provided may be any type of content, such as textual content, audio content, video content, image content, etc. In one embodiment, the content provider 117 may provide content that may supplement content of the applications 103, the sensors 105, or a combination thereof. By way of example, the content provider 117 may provide content that may process content items of interest associated with a virtual world where users are able to pull out floors from buildings to see and interact with the content items there. In one embodiment, the content provider 117 may also store content items associated with the UE 101, the drawer UI platform 109, and the services 115 of the services platform 113. In another embodiment, the content provider 117 may manage access to a central repository of data, and offer a consistent, standard interface to data, such as a repository of users' navigational data content.

By way of example, the UE 101, the drawer UI platform 109, the services platform 113, and the content provider 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
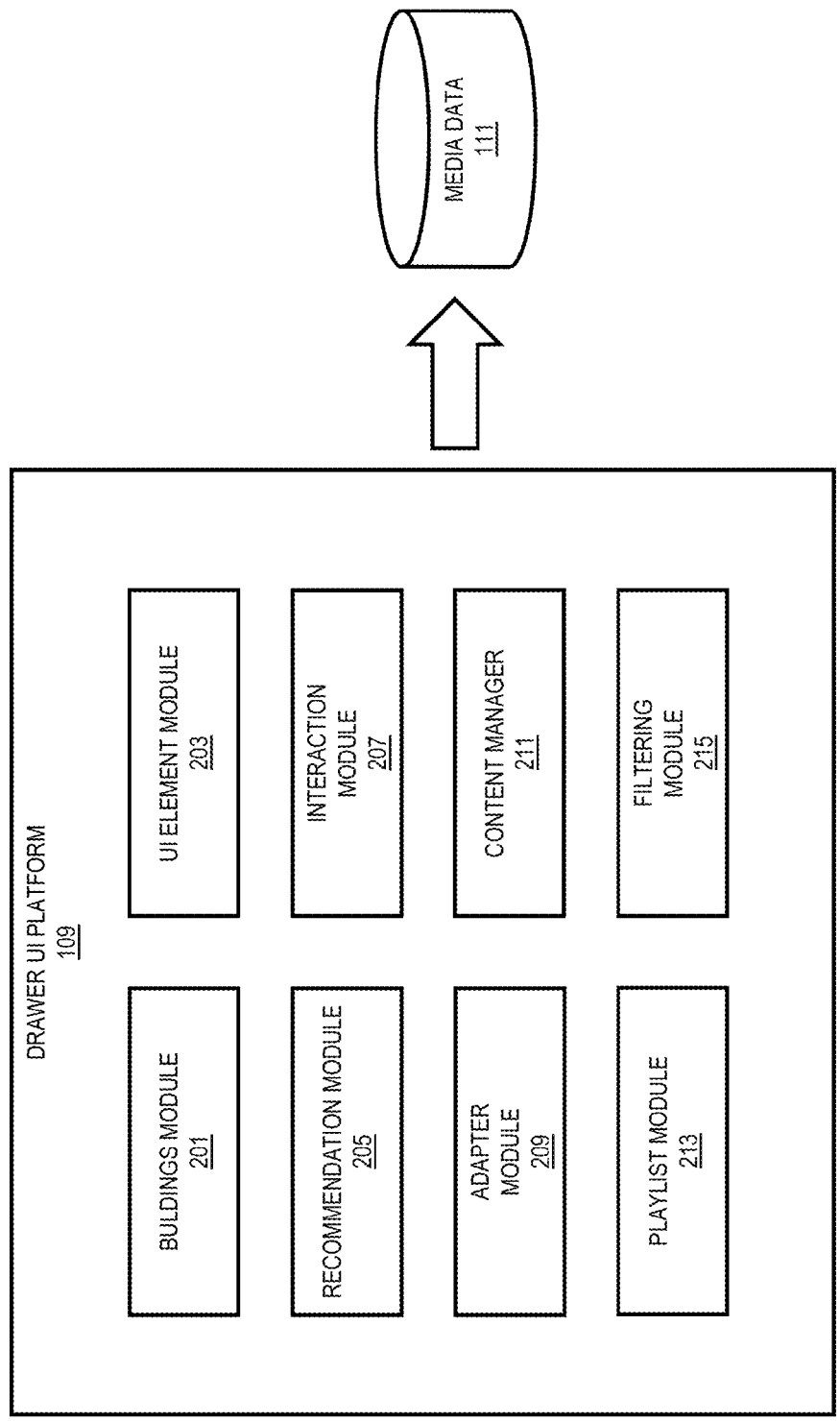
FIG. 2 is a diagram of the components of a media service platform, according to one embodiment.

FIG. 2 is a diagram of the components of a media service platform, according to one embodiment. By way of example, the drawer UI platform 109 includes one or more components for providing a drawer-based user interface for content access or recommendation. It is contemplated that the functions of these components may be combined in one or more components or performed by other components of equivalent functionality. In this embodiment, the media service platform includes buildings module 201, UI element module 203, recommendation module 205, interaction module 207, adapter module 209, content manager 211, playlist module 213, and filtering module 215, all of which may communicate with media data 111.

In one embodiment, the buildings module 201, determines whether the user is associated with a real building fixed at a particular point of interest or a virtual building in a virtual city. Buildings module 201 may randomly create virtual buildings upon a user's request using pre-loaded building structure outlines, textures, roofs, windows, door styles, fire escapes, and awnings. Buildings module 201 may also support a user creating his building from the pre-loaded sets of building components. According to one embodiment, a photo-editing program is available so that the user may further edit his virtual building (allowing the user to change colors, sizes, etc.). The building may be a virtual presentation of a real world building, a virtual building generated without a counterpart in the real world or a combination thereof. Buildings module 201 also determines the number of drawers a building may hold, and one or more drawers placed in a building.

In one embodiment, the buildings module 201 processes or facilitates extracting information from the content manager 211 to determine one or more features of the one or more representations of the building. The features of the one or more buildings may be doors, windows, columns, etc. as well as the dimensions, materials, colors of the structural components.

In one embodiment, the UI element module 203, processes and/or facilitates a processing of one or more renderings of the virtual display area, the one or more representations, the one or more features, or a combination thereof to depict media processing effects, a time of day, a theme, an environmental condition, or a combination thereof. The depiction of mode, theme or condition can attract a viewer's attention. The designation of the features as elements of the virtual display may include the accessing and retrieval of information associated with the buildings and their features from a local or external database. In one embodiment, the one or more features represent, at least in part, one or more windows, one or more doors, one or more architectural features, or a combination thereof of the building. The UI element module 203 causes presentation of UI elements (i.e., drawers) in the virtual display area. The applications 103 and/or services 115 may be activated by the user of UE 101, by services platform 113, by a component of communication network 107 (not shown) or a combination thereof. In one embodiment, the UI element module 203 determines to generate at least one animation including the one or more other representations of the one or more drawers determined by the interaction module 207, wherein the rendering of the interactions by the UI element module 203 includes, at least in part, the at least one animation, and wherein the animation relates, at least in part, to the media profile and/or the media information, building information, drawers, or a combination thereof.

The UI element module 203 may create GUI associations for various content items in the form of household furnishings. For example, a GUI of a reading chair may represent ebook content items or a set of turntables may represent a re-mixed playlist, etc.

In one embodiment, the recommendation module 205 receives input for specifying one or more recommendations associated with the building, the one or more representations, the one or more features, the one or more users, or a combination thereof. In one embodiment, the recommendations determined, stored and used by the recommendation module 205 may include information about available buildings or available features of buildings for associating content items with. The recommendation information may be previously stored in media data 111. In one embodiment, the content manager 211 may query the recommendation module 205 for recommendations associated with the buildings, drawers, cities, or a combination thereof prior to the presentation of the one or more recommendations and present the recommendations based, at least in part, on the one or more recommendations received from the recommendation module 205.

In one embodiment, the interaction module 207 determines one or more representations of interactions among UI elements as directed via user manipulation of the UI elements. The interaction module 207 then causes rendering of the interaction by the UI element module 203, in which the one or more representations of the UI elements interact with the one or more representations of other UI elements, the one or more features, the virtual display area, as well as the presentation of connecting element, the one or more outputs, or a combination thereof. In one embodiment, a content provider may, for example, add UI elements to the virtual representation of the real world and the interaction module 207 may generate interactions among the UI elements and the virtual representation of buildings. For example, animated characters, objects, etc. may be added to the presented output to for example interact with other objects (e.g., as a game), advertisements (e.g., banners, etc.), etc.

In one embodiment, the adapter module 209 determines playback rendering, at least in part, on the interactions of the UI elements. The rendering may include adding or removing content items, playback media content associated with the building, rendering media content associated with the building with one or more playback rendering effects, etc.

In one embodiment, the content manager 211 collects content stored in media data 111 and content provider 117 and supplies this content to applications 103, services 115, and various modules in the drawer UI platform (recommendation module 205, adapter module 209, playlist module 213, and filtering module 215); and determines the metadata associated with content items (i.e., playlists, time, date, location, users, etc.). Content manager 211 and the playlist module 213 may determine which songs to playback upon a user opening a drawer. According to one embodiment, the content manager 211 may sync its data with the media data 111 at regular intervals. Content manager 211 may keep track for user content data and metadata. The content manager 211 may catalogue when a track was last played, times played, genre, and similar tracks, to name a few examples.

In another embodiment, the playlist module 213 determines media content, building characteristics, etc. to construct a playlist based, at least in part, on one or more characteristics associated with the one or more UI elements, their interactions, or a combination thereof. For example, the one or more characteristics may include the dimensions, the building material, etc. of a room in the building, media content associated with the buildings or drawers, and the like.

In one embodiment, the playlist module 213 determines to modify one or more rendering characteristics of the one or more UI elements, the one or more features of the presentation of content items associated with the drawers or buildings, wherein the one or more characteristics include, at least in part, a lighting characteristic, a color, a bitmap overlay, an audio characteristic, a visual characteristic, or a combination thereof. It is noted that even though the virtual display is generated based on the buildings of the real world and their features, however the digital characteristics of the virtual display enables various modifications on the features such as color, shape, appearance, lighting, etc. These modifications may affect the user experience and attract user's attention to a certain content, provided information, etc.

In some embodiments, the playlist module 213 determines contextual information associated the UE 101, and then determines the media content to render on the user device based on the contextual information. By way of example, the contextual information may include, for instance, time of day, location, activity, etc. In other embodiments, the playlist module 213 may vary the media content over time or location without specific reference to the context of the UE 101.

In one embodiment, the filtering module 215 may determine levels of access available to different users. Filtering module 215 provides options for and determines when users have set various filters for each of their buildings, drawers, and content items. For example, the filtering module 215 may cause all of a user's content items to be hidden from the public, while a different user's content items may be viewed and open by the public. Still others may allow only certain users to whom they are associated with such access to their content items. Filtering module 215 may cause yet another user to hide some of his content items but not others either to the public or to associated users.

Figure 3:
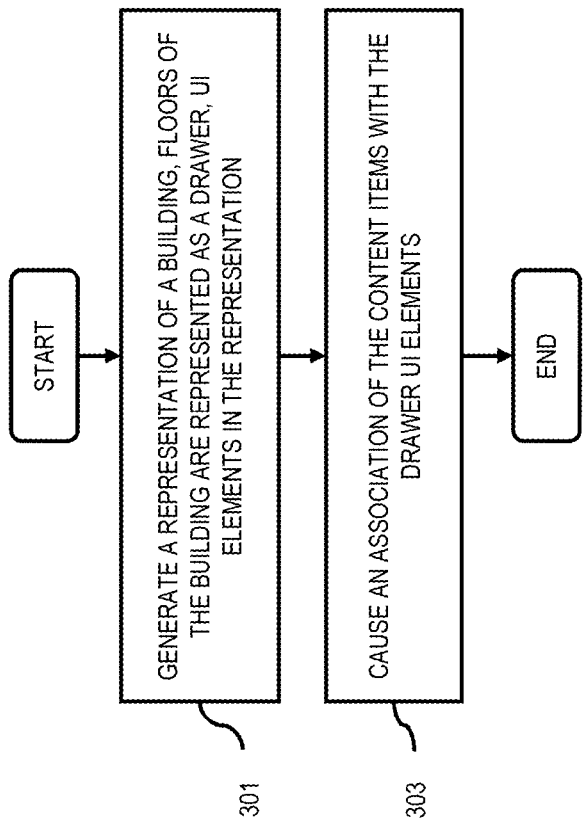
FIG. 3-6 is a flowchart of a process for providing a drawer-based user interface for content access or recommendation, according to one embodiment.
Figure 14:
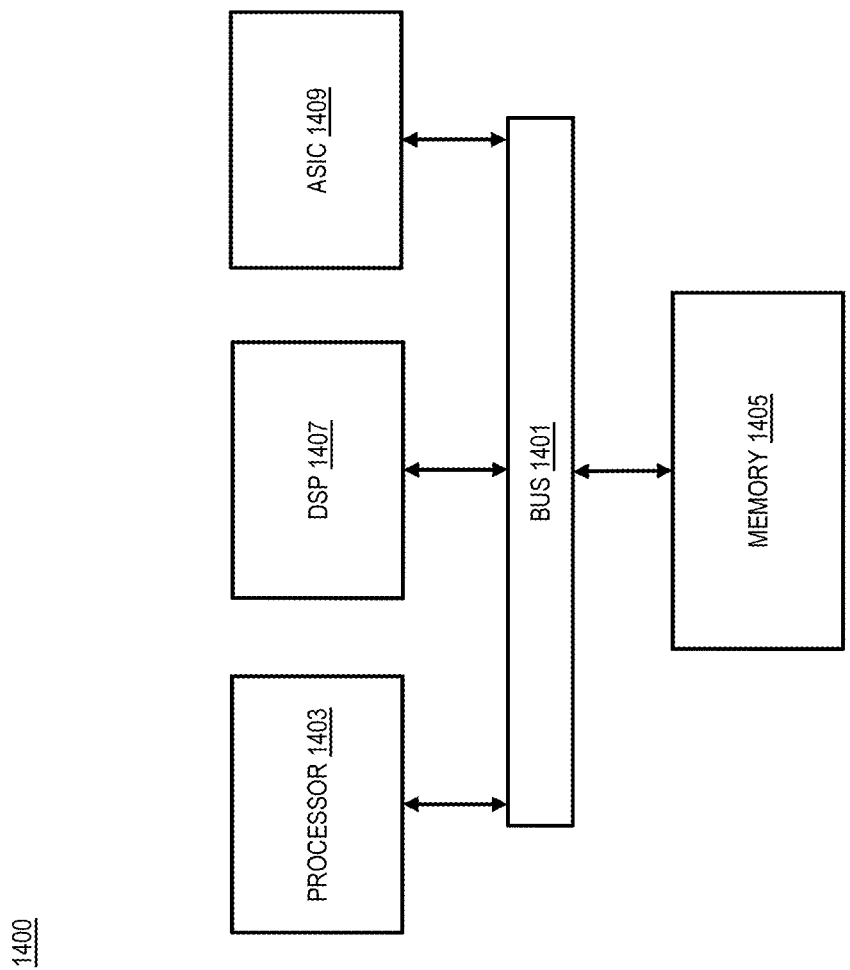
FIG. 14 is a diagram of a chip set that can be used to implement an embodiment of the invention.

FIG. 3 is a flowchart of a process for providing a drawer-based user interface for content access or recommendation, according to one embodiment. In one embodiment, the drawer UI platform 109 performs the process 300 and is implemented in, for instance, a chip set including a processor and a memory as shown in FIG. 14.

In step 301, the drawer UI platform 109 causes, at least in part, a generation of at least one representation of at least one building, wherein one or more floors of the at least one building are represented as one or more drawer user interface elements in the at least one representation. These buildings may represent a real building at certain POI on a real map, or a virtual representation of either a real or virtual building in a virtual city. Each floor on the front side of the building is a GUI for the front of a drawer such that the five sides of a floor are analogous to the five sides of a drawer. Users may interact with these buildings by pulling out the virtual floors of the building; much like one would pull out a drawer in a dresser.

In step 303, the drawer UI platform 109 causes, at least in part, an association of one or more content items with the one or more drawer user interface elements, wherein one or more user interactions with the one or more drawer user interface elements causes, at least in part, an initiation of one or more operations on the one or more content items. The drawers may contain various media files such as songs, ebooks, movies, images, etc. These media files are collectively referred to as content items. There are various GUI representations of these content items, including but not limited to text and icon representations. According to one embodiment, when the user opens a drawer containing an audio song content item, the music may play immediately. In the case of opening multiple drawers at the same time, the drawer UI platform 109 may generate a mix of content items located in the associated drawers or create a playlist of the corresponding content items. According to one embodiment, the user is able to open drawers from buildings to access music and move favorite drawers as floors of his own building frame (e.g., to create a playlist or influence a playlist with a type of content).

Figure 4:
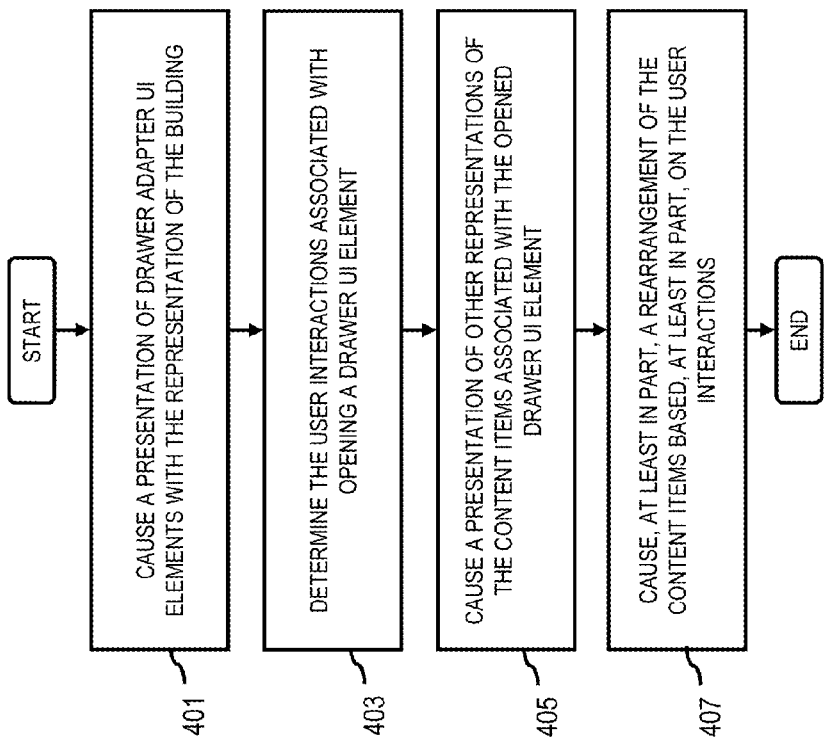

FIG. 4 is a flowchart of a process for virtual interaction with floors in virtual buildings capable of storing, editing, and organizing the content items therein. In one embodiment, the drawer UI platform 109 performs the process 300 and is implemented in, for instance, a chip set including a processor and a memory as shown in FIG. 14.

Figure 10:
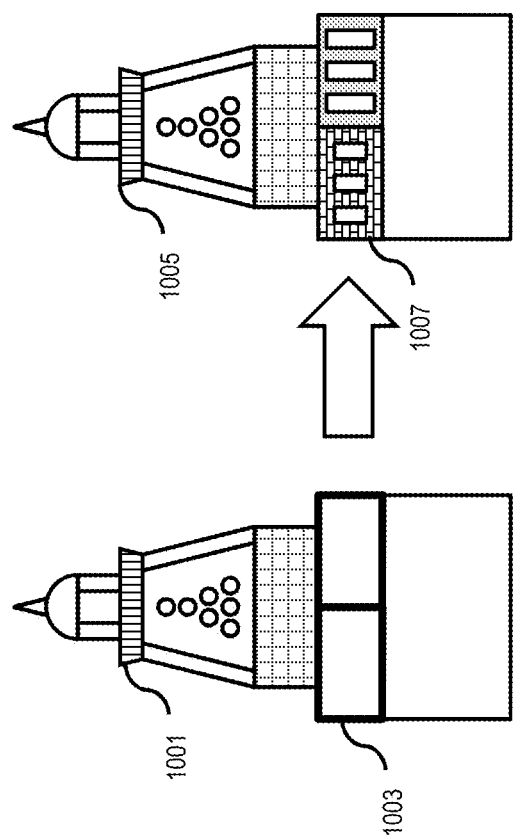

In step 401, the drawer UI platform 109 causes, at least in part, a presentation of one or more drawer adapter user interface elements with the at least one representation of the at least one building, wherein the one or more drawer adapter user interface elements enable a configuration of the one or more drawer user interface elements within the at least one building, a drawer interaction among the one or more drawer user interface elements, or a combination thereof. According to one embodiment, the user's building frame can offer different adapter components for the drawers. Adapters allow users greater flexibility and control over content items playback. For example, each adapter can hold one or more floor drawers. Users may then assign one or more adapters to each floor to combine the adapter functionality (see FIG. 10).

Additionally, wherein the configuration, the drawer interaction, or a combination thereof are associated with (1) creating a playback order for the one or more content items, (2) determining one or more transitions between a playback of the one or more content items, (3) determining a parametric evolution for a playback of the one or more content items, (4) causing a union of the one or more content items, (5) determining an intersection of the one or more content items, (6) causing a selection of the one or more content items based, at least in part, on a stylistic criterion, (7) causing an arrangement of the one or more content items based, at least in part, on a stylistic criterion, or a (8) combination thereof.

According to one embodiment, playback adapters may include alternative adapters, transition adapters, parametric adapters, and others. Alternative adapters may play tracks from associated drawers, one from each drawer at a time (i.e., A-B-A-B-A-B). Transition adapters start from the first drawer playing its content before transferring to the next associated drawer, then repeating the same process of playing the entire drawer before moving on to the next associated drawer. Parametric evolution adapters may play the songs, for example, based on tempo progression from fast to slow tracks or slow to fast tracks, when the content is selected from associated drawers. As another example, parametric evolution adapters might play the songs from aggressive to romantic, quiet to energetic, or in any other evolution or progression according to some musical feature or parameter.

According to one embodiment, a content selection adapter may include such adapters as union adapter, intersection adapter, stylistic intersection adapter, and others. For example, a union adapter may play songs from multiple drawers, where any song from either drawer may be played. An intersection adapter may only play songs that are found from all drawers associated with the adapter. A stylistic intersection adapter may play only songs that match a specified adapter style or mood from the associated drawers. Another example of how a stylistic intersection adapter may be used is by playing songs in an order that they best go together based on the style of the songs.

In step 403, the drawer UI platform 109 determines that the one or more user interactions are associated with the opening of the one or more drawer user interface elements. A user may open a drawer by sliding that particular floor of a building out of the building, similar to opening a dresser drawer. The drawer would then be a GUI of the floor with four walls. There would be no ceiling in the room or floor so that the user may "look into" the room the way one might look into a drawer. According to one embodiment, the users are able to populate their own building frames with favorite drawers and these can be shared as playlists for other people. An example user interaction may include initiating playback. In step 405, the drawer UI platform 109 causes, at least in part, a presentation of one or more other representations of the one or more content items associated with the opened one or more drawer user interface elements. According to one embodiment, users will be able to see the content items located in each drawer by pulling out the drawer of the building. Users may add content items to their drawers and set various levels of privacy and interactions by visitors. For example, a user may allow others to see the content items in his drawers, but not open the files. Another user may allow for others to see the content items in his drawer and also to open these content items. Yet another user may allow others to add additional items to his drawer and or change the order of various playlists.

In step 407, the drawer UI platform 109 determines that the one or more user interactions is associated with a moving of the one or more drawer user interface elements (1) within the at least one representation, (2) between the at least one representation and at least one other representation of at least one other building, or (3) a combination thereof; and cause, at least in part, a rearrangement of the one or more content items based, at least in part, on the one or more user interactions, wherein the one or more content items are the one or more content items consumed by one or more users associated with the one or more floors represented by the one or more drawer user interface elements. According to one embodiment, with an adapter, two or more drawers from two buildings can be placed into the same floor of a third building, thus creating a new mix of the drawers' contents. The drawer UI platform 109 may identify which songs go best together and change the order accordingly.

Figure 5:
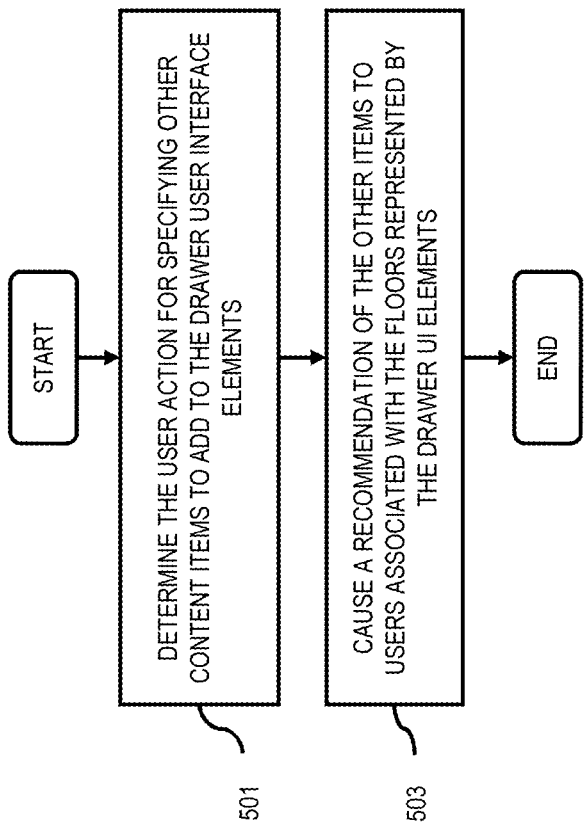

FIG. 5 is a flowchart of a process for adding content items to drawers and allowing the drawers to make recommendations to its associated users. In one embodiment, the drawer UI platform 109 performs the process 300 and is implemented in, for instance, a chip set including a processor and a memory as shown in FIG. 14.

In step 501, the drawer UI platform 109 determines that the one or more user interactions is for specifying one or more other content items to add to the one or more drawer user interface elements. According to one embodiment, a user may add new types of songs to the drawer by putting the song files in the drawer. In step 503, the drawer UI platform 109 causes, at least in part, a recommendation of the one or more other items to one or more users associated with the one or more floors represented by the one or more drawer user interface elements. According to one embodiment, the real users physically located in the building will receive files placed in the building's drawer as a recommendation.

Figure 6:
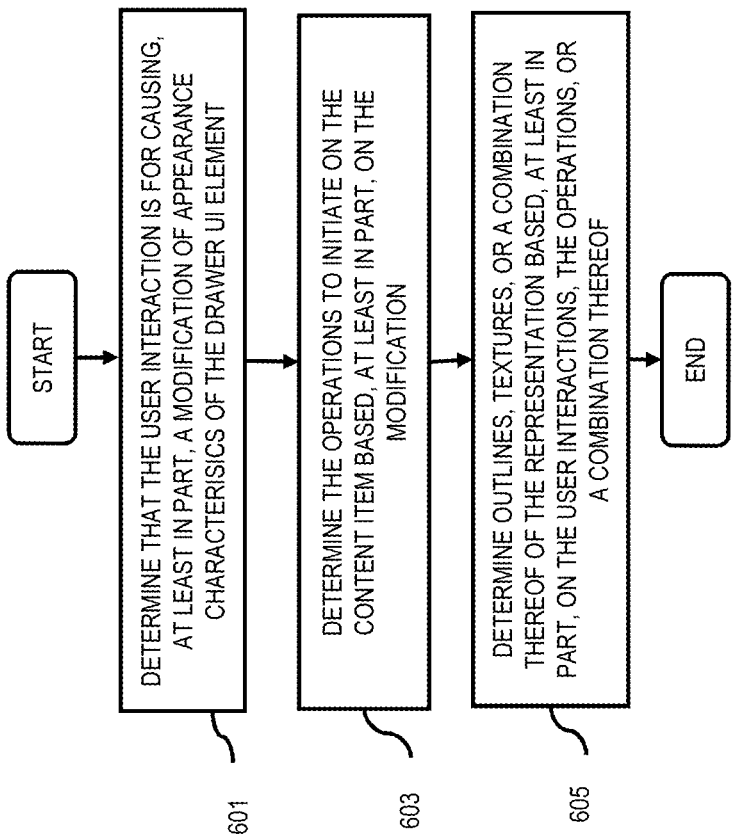

FIG. 6 is a flowchart of a process for creating building appearance modifications which may affect the content items within the building's drawers. In one embodiment, the drawer UI platform 109 performs the process 300 and is implemented in, for instance, a chip set including a processor and a memory as shown in FIG. 14.

In step 601, the drawer UI platform 109 determines that the one or more user interactions is for causing, at least in part, a modification of one or more appearance characteristics of the at least one drawer user interface element. According to one embodiment, a user may use a paint program to alter the look and feel of a building or drawer. Additionally, users may change the texture of the building walls.

In step 603, the drawer UI platform 109 determines the one or more operations to initiate on the one or more content items based, at least in part, on the modification. According to one embodiment, the user can select a software paint tool for filling the drawer with a specific color, pattern, or photo that represents the music associated with the drawer. For example, pouring blue paint may cause blues to be added in the playlist, pouring red may add rock music, pouring black may add metal music, and so on. In this example, different colors may be associated with different musical genres. In one embodiment, the user may obtain cover versions of the drawer's songs in the style defined through the modification (e.g., modifying the appearance of a drawer by filling it with blue paint would prompt the drawer UI platform 109 to play blues versions of the songs). In another embodiment, the building textures can change based on the user interactions to indicate what has been modified. However, in this example, the building outline would not change it keep it recognizable.

In step 605, the drawer UI platform 109 determines one or more outlines, one or more textures, or a combination thereof of the at least one representation based, at least in part, on the one or more user interactions, the one or more operations, or a combination thereof, wherein the at least one representation of the at least one building includes, at least in part, a building frame that is initially configured without the one or more drawer user interface elements. In one embodiment, every user has their own empty building frame that may be capable of holding multiple floors. This building frame may be customized to the users liking in terms of architecture, wall texture, windows, doors, awnings, roof, etc.

Figure 7A:
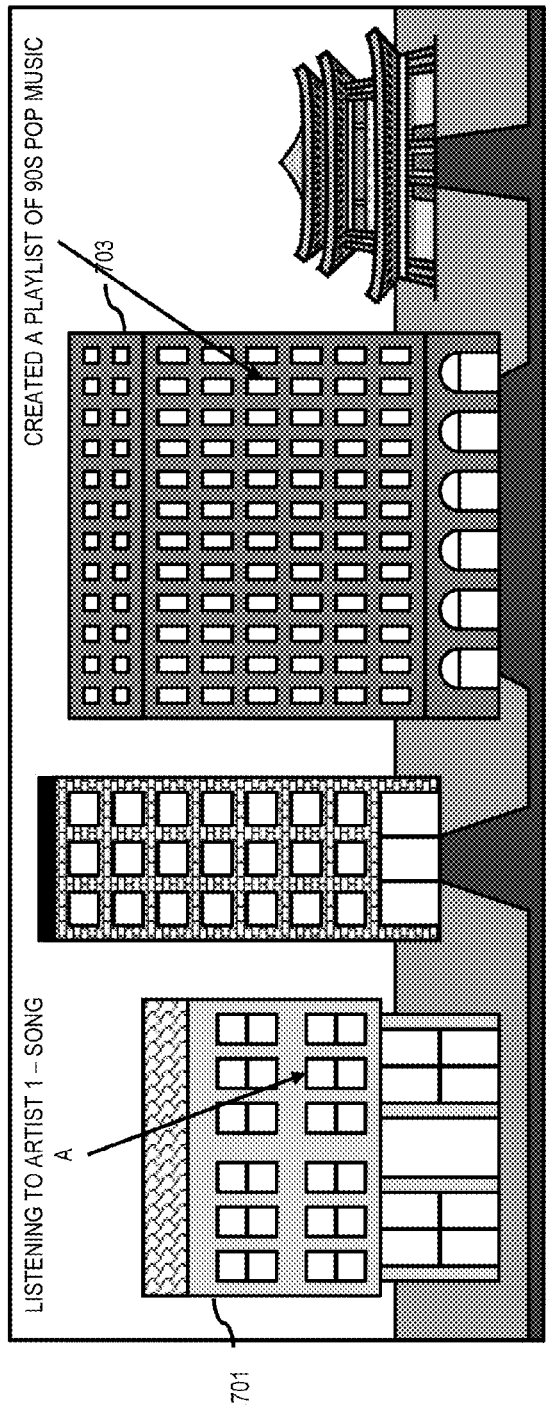
Figure 7B:
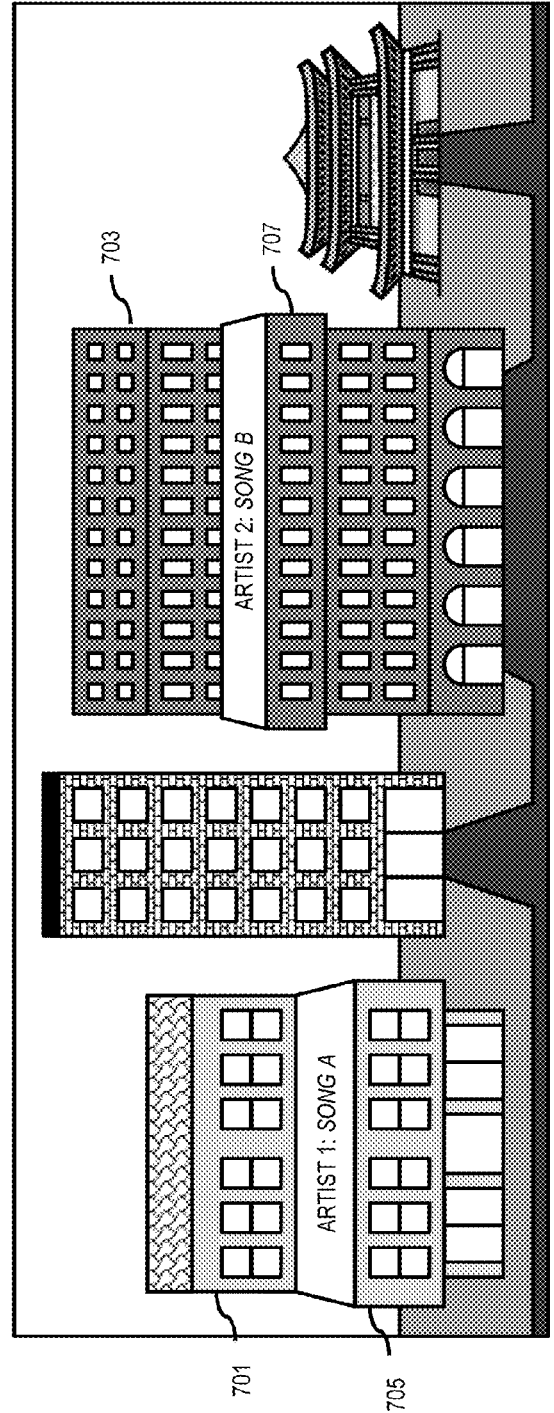

FIG. 7A-7B is a diagram of the user interface utilized in the processes of FIG. 3-6, according to one embodiment. FIG. 7A-7B juxtaposes a scene contrasting what is happening in the real world (7A) with what may be on the user interface of a user's UE 101 (7B). In the example of FIG. 7A, building representations 701 and 703 are presented in which various residents of buildings are listening to various songs. FIG. 7A is an illustration of a scenario without drawer UI platform 109 wherein the songs played in various building representations are not privy to others. FIG. 7B depicts what a user of drawer UI platform 109 may see after pulling out various drawers representations of floors to discover the music that is played in building representations 701 and 703. According to one embodiment, building representations with music playing may have a music note icon to alert the user that one or more songs are being played. Once the user selects a representative floor to inspect, the UI may display the artist and song name in the drawer GUI, as shown in FIG. 7B, with building drawer representations 705 and 707. Additional embodiments may include additional information displayed in the drawer representations, including but not limited to: album title, playlist name, username of the person listening to the music, lyrics, album art, artist pictures, other pictures thematically associated with the artist or song, and additional content items which the user has chosen to associate with the current song. According to one embodiment, when the user opens the drawer representation to see the artist and song title, the user may also see an icon in the drawer representation that, once selected, will allow the user to view all the content items in the drawer representation.

Figure 8:
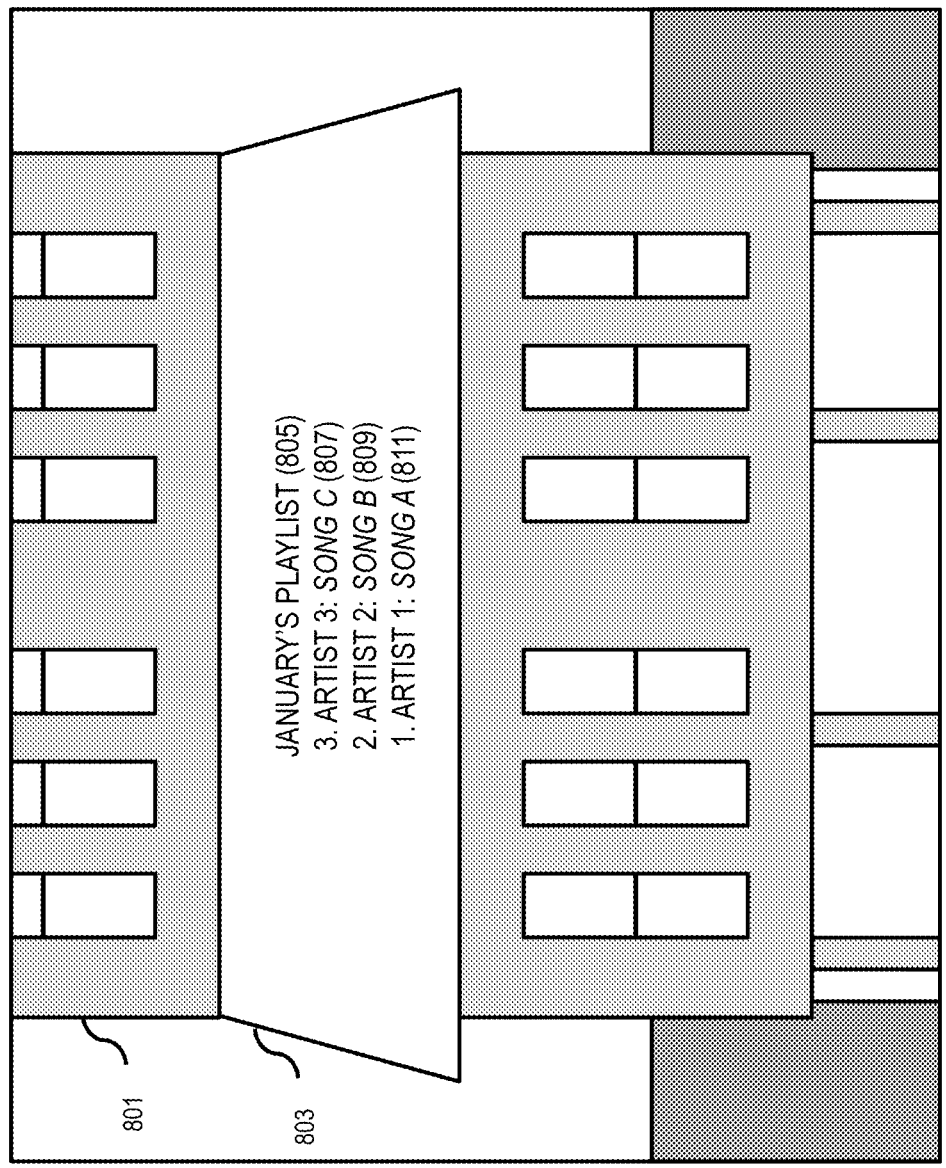

FIG. 8 is a diagram of user interface utilized in the processes of FIG. 3-6, according to one embodiment. FIG. 8 displays a possible UI for songs in a drawer representation. According to one embodiment, the song that is closest to the user is played first. For example, in representative building 801, representative drawer 803 contains January's Playlist 805. Artist 1's Song A 811 would be played first since it is the song closest to the user. Artist 2's Song B 809 would be played next and Artist 3's Song C 807 would be played last since it is the furthest song from the user. According to another embodiment, an icon-sized album cover may appear next to each track's information in the drawer representation. According to one embodiment, a user may re-order the playlist by moving the location of the various tracks in the drawer representation or by shaking the device in the case the UE 101 is mobile and contains a motion sensor. The user may tap the song or playlist name to modify replaying single tracks or the entire playlist. The user may utilize swipe motions to further control the playback. The user may swipe right to replay a song once or swipe left to remove a track from the playlist. The user may also re-assign various swipe motions with different commands. In another embodiment, the user is further able to see the different room representations when the drawer/floor representations are pulled out. Different room representations may correspond to different albums or song, for example, if the floor representation is associated to an album, musical genre or artist. The user may be further able to change the playback order of songs in the drawer representation by modifying the representative floor plan (changing the order/arrangement/layout of the room).

According to another embodiment, various content items may have a GUI representation. To enable meaningful associations of songs to room objects, the songs may be associated according to listening situation. For example, video clips, shows, and movies may be present in the GUI as a television set, books may have a GUI representation in the form of a bookcase and music may have a GUI representation of a stereo, MP3 player, or headphone set. Additionally, tapping on GUI furniture representation such as beds or exercise machines may influence the style or tempo of the music selection. Tapping on a GUI bed would slow down the mood of the music while tapping on a GUI exercise machine may speed up the tempo of the songs played. Such associations between music pieces and GUI furniture may be inputted by the users themselves (e.g., via tagging music with consumption related tags such as "relaxing"), harvested or collected from online information sources or data providers, or collected from automatic music scrobbling where the client submits information on songs played and the situation during the content rending, such as "at home" or "bicycling."

FIG. 9A-9B is a diagram of user interface utilized in the processes of FIG. 3-6, according to one embodiment. FIG. 9A-9B displays a possible GUI for a building representation and playlist creation. FIG. 9A demonstrates a possible user representative building frame before personalized floors/drawers representations are added. According to one embodiment, the user will be able to create a GUI building representation and drawer UI platform 109 will associate this representative structure to their user profile. Drawer UI platform 109 may also allow the user to duplicate the representative structure of an existing building (e.g., the Empire State Building, etc.). According to one embodiment, the number of representative or GUI buildings a user may associate with his profile may vary depending on the level of membership the user may have with the service (e.g., premier, standard, junior, trial, etc.). Once the GUI building's frame has been selected, the user may select the location of the GUI building on a virtual map or the drawer UI platform 109 may automatically assign the location of the GUI building on a virtual map, depending on user preference. According to one embodiment, the user may also select the representative building of his residence in an actual map. Once the GUI building representation has been placed on either a virtual or actual map, the user may begin adding GUI drawer representation or floor representation to their GUI building representations. The user may create their own GUI drawer representations or the user may add GUI drawer representations that were taken from other GUI building representations. GUI building representation 901 in FIG. 9A is an example of a GUI building representation composed partially of floors from other GUI building representations. For example, level 905 and 907 are from GUI building representations 917 and 911, respectively. According to one embodiment, access to higher level floors within a GUI building representation may also be subject to membership level. For example, only premium members may have access to the top levels of a GUI building representation.

FIG. 9B demonstrates how GUI drawer representations can be inserted to other GUI building representations to add different types of music content (e.g., influence a playlist with different types of music of change songs in a playlist). Drawer representations from different GUI building representations may be swapped. For example, GUI building representations 909 and 913 have exchanged a set of GUI drawer representations 911 and 915. This exchange may be observed visually as the GUI building representation interface of the swapped GUI drawers representation still reflects the architecture styling of its original GUI building representation. This type of swap may expand the music content available in a particular GUI building representation, influence the current music, or change songs in a playlist. According to one embodiment, actions affecting playback options that are available for GUI drawer representations are also available for GUI building representations. For example, entire GUI building representations may swap all of their GUI drawer representations with one another. The rearrangement may also take place on a macro level where groups of GUI building representations are capable of swapping their contents with one another.

FIG. 10A-10B is a diagram of user interface utilized in the processes of FIG. 3-6, according to one embodiment. FIG. 10A-10B displays the addition of adapters to enhance the flexibility and value of system 100. As previously mention, according to one embodiment, the higher level floors of a GUI building representation, or the penthouse, may boast exclusive privileges such as greater storage and limited public access. An additional advantage to premium membership may be the use of various premier adapters. Regular adapters allow users to swap GUI floor representations between various GUI building representations. With a "twin" adapter, two GUI drawer representations from two GUI building representations can be placed into the same floor of a third GUI building representation, thus creating a new mix of the GUI drawers' contents. For example, FIG. 10A displays GUI building representation 1001 with a twin adapter in its penthouse GUI drawer representation 1003. Thus, GUI drawer representation 1003 is capable of storing twice the number of songs allowed by a standard adapter. GUI building representation 1005 demonstrates GUI drawer representation 1007 composed of GUI drawer representations from two different GUI building representations (denoted by the different GUI pattern walls and windows) in each slot of the twin adapter.

According to one embodiment, adapters may also playback music and render playback. For example, a seamless adapter may play seamless beat-mixed mash-ups of songs. A remix adapter may search different remix versions of the drawer representation songs and play them; and may be associated to a specific DJ and his remixes can be prioritized. A live adapter may select live versions of associated songs from drawer representations and play them. A music video adapter may find music videos of associated songs and play them accordingly. A slideshow adapter may find still images matching the topic, either locally from the content items in the drawer representations or by searching the internet, and create a slideshow using a stylistic adapter where a romantic song would yield romantic images. According to one embodiment, the slideshow adapter may create a slideshow with a combination of both still images and video clips.

Figure 11:
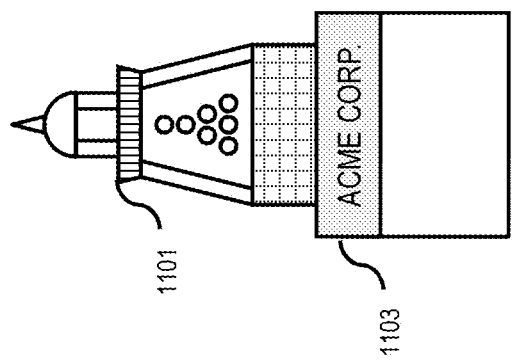

FIG. 11 is a diagram of user interface utilized in the processes of FIG. 3-6, according to one embodiment. FIG. 11 displays an example of a sponsored drawer representation. Any drawer representation may be sponsored. Sponsorship allows for a sponsoring company to place their logo or other advertising content as a message, image, or video in the front of the drawer representation. Users will get free music represented by the drawer representations that have the logo of the sponsoring company. For example, building representation 1101's penthouse drawer representation 1103 is sponsored by ACME Corp. Thus, the sponsoring company (ACME Corp.) may display their company name or logo across the front of the drawer representation.

Figure 12:
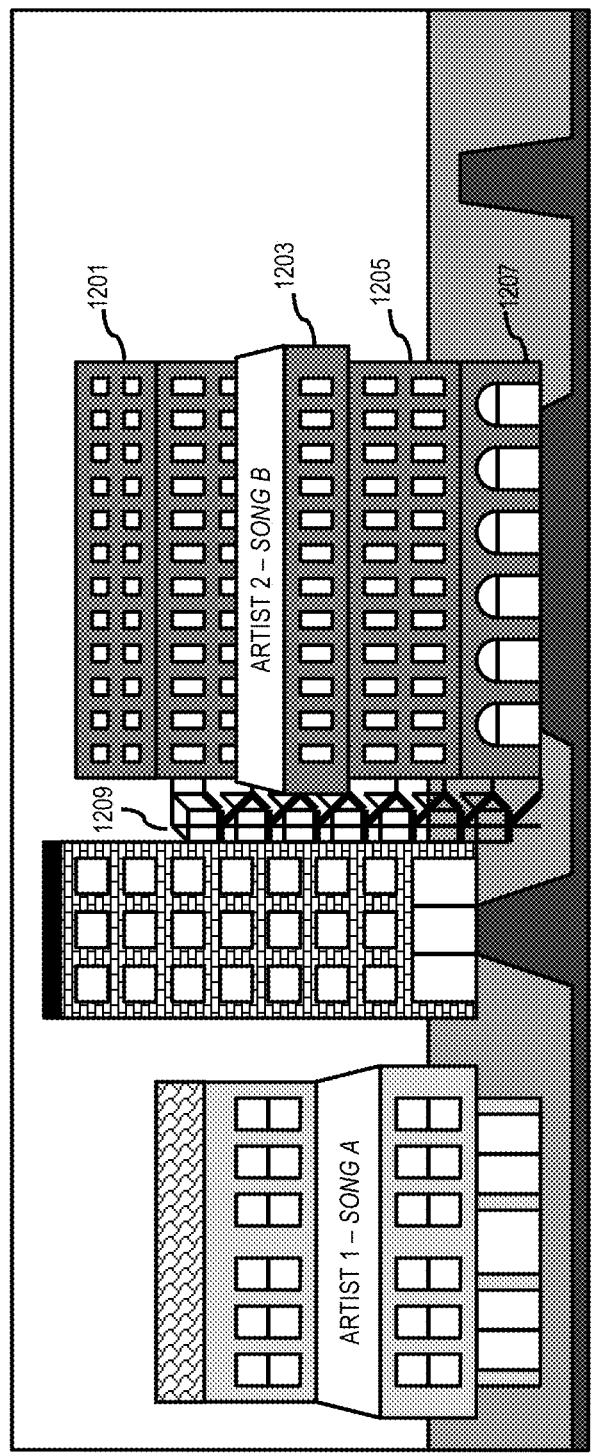

FIG. 12 is a diagram of user interface utilized in the processes of FIG. 3-6, according to one embodiment. FIG. 12 displays adapters that are capable of connecting floor representations which are not adjacent horizontally or vertically. For example, building representation 1201's first (1207) and third (1203) story drawer representations are not adjacent as there is a floor representation in between them (1205). However, adapter 1209, represented by the GUI as a fire escape, may allow a user to create a playlist merging the contents of the 1203 and 1207 drawer representations, despite their distance. According to another embodiment, the GUI fire escape representation may be replaced with a long climbing GUI rope alongside the building representation.

The processes described herein for providing a drawer-based user interface for content access or recommendation, according to one embodiment may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 13:
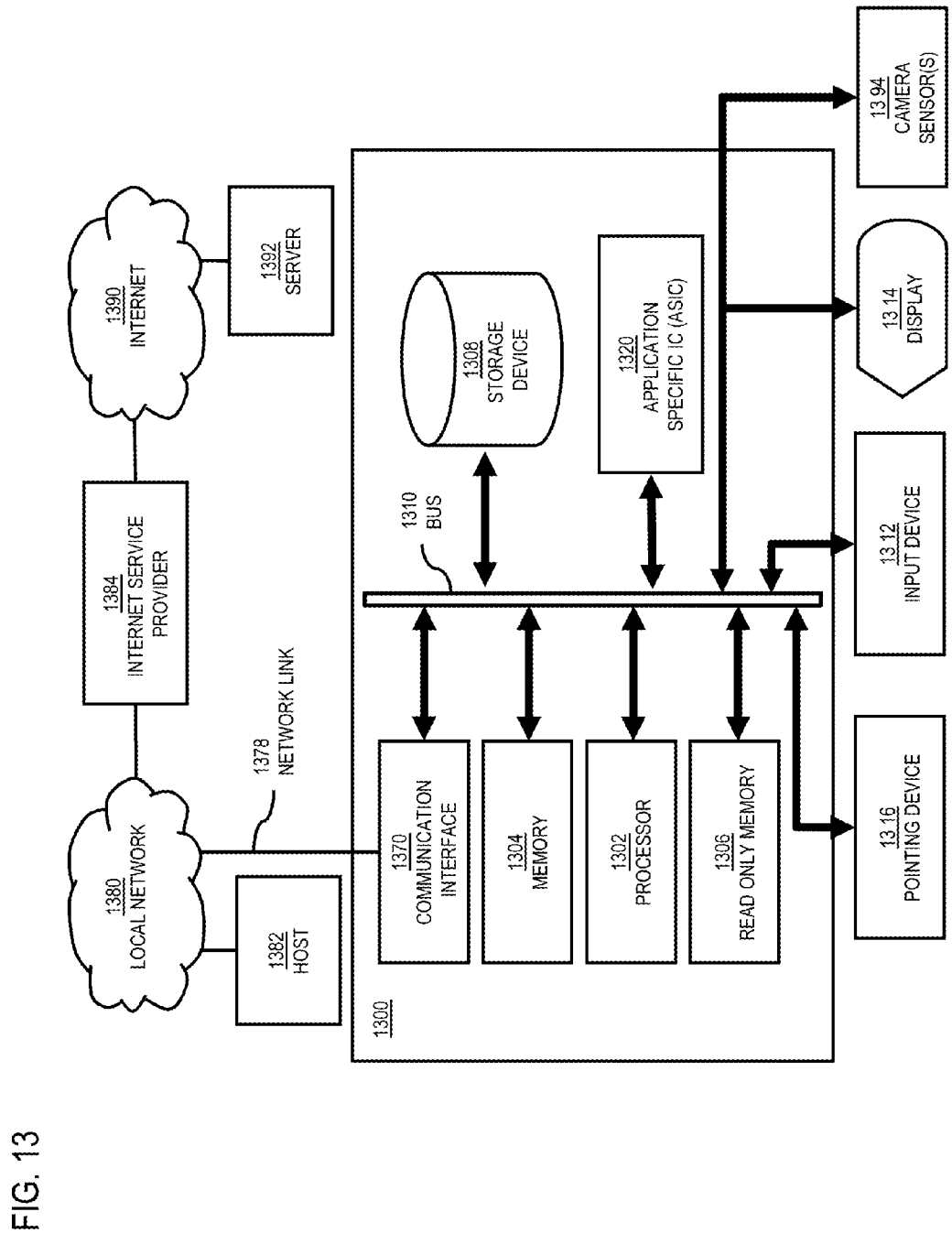
FIG. 13 is a diagram of hardware that can be used to implement an embodiment of the invention.

FIG. 13 illustrates a computer system 1300 upon which an embodiment of the invention may be implemented. Although computer system 1300 is depicted with respect to a particular device or equipment, it is contemplated that other devices or equipment (e.g., network elements, servers, etc.) within FIG. 13 can deploy the illustrated hardware and components of system 1300. Computer system 1300 is programmed (e.g., via computer program code or instructions) to providing a drawer-based user interface for content access or recommendation as described herein and includes a communication mechanism such as a bus 1310 for passing information between other internal and external components of the computer system 1300. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1300, or a portion thereof, constitutes a means for performing one or more steps of providing a drawer-based user interface for content access or recommendation.

A bus 1310 includes one or more parallel conductors of information so that information is transferred quickly among devices coupled to the bus 1310. One or more processors 1302 for processing information are coupled with the bus 1310.

A processor (or multiple processors) 1302 performs a set of operations on information as specified by computer program code related to providing a drawer-based user interface for content access or recommendation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1300 also includes a memory 1304 coupled to bus 1310. The memory 1304, such as a random access memory (RAM) or any other dynamic storage device, stores information including processor instructions for providing a drawer-based user interface for content access or recommendation. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information, including instructions, that is not changed by the computer system 1300. Some memory is composed of volatile storage that loses the information stored thereon when power is lost. Also coupled to bus 1310 is a non-volatile (persistent) storage device 1308, such as a magnetic disk, optical disk or flash card, for storing information, including instructions, that persists even when the computer system 1300 is turned off or otherwise loses power.

Information, including instructions for providing a drawer-based user interface for content access or recommendation, is provided to the bus 1310 for use by the processor from an external input device 1312, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314, such as a cathode ray tube (CRT), a liquid crystal display (LCD), a light emitting diode (LED) display, an organic LED (OLED) display, a plasma screen, or a printer for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1394 for capturing, recording and causing to store one or more still and/or moving images (e.g., videos, movies, etc.) which also may comprise audio recordings. In some embodiments, for example, in embodiments in which the computer system 1300 performs all functions automatically without human input, one or more of external input device 1312, display device 1314 and pointing device 1316 may be omitted.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes. Examples of ASICs include graphics accelerator cards for generating images for display 1314, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1300 also includes one or more instances of a communications interface 1370 coupled to bus 1310. Communication interface 1370 provides a one-way or two-way communication coupling to a variety of external devices that operate with their own processors, such as printers, scanners and external disks. In general the coupling is with a network link 1378 that is connected to a local network 1380 to which a variety of external devices with their own processors are connected. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends or receives or both sends and receives electrical, acoustic or electromagnetic signals, including infrared and optical signals, which carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 1370 enables connection to the communication network 107 for providing a drawer-based user interface for content access or recommendation to the UE 101.

The term "computer-readable medium" as used herein refers to any medium that participates in providing information to processor 1302, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1308. Volatile media include, for example, dynamic memory 1304. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1320.

Network link 1378 typically provides information communication using transmission media through one or more networks to other devices that use or process the information. For example, network link 1378 may provide a connection through local network 1380 to a host computer 1382 or to equipment 1384 operated by an Internet Service Provider (ISP). ISP equipment 1384 in turn provides data communication services through the public, world-wide packet-switching communication network of networks now commonly referred to as the Internet 1390.

A computer called a server host 1392 connected to the Internet hosts a process that provides a service in response to information received over the Internet. For example, server host 1392 hosts a process that provides information representing video data for presentation at display 1314. It is contemplated that the components of system 1300 can be deployed in various configurations within other computer systems, e.g., host 1382 and server 1392.

At least some embodiments of the invention are related to the use of computer system 1300 for implementing some or all of the techniques described herein. According to one embodiment of the invention, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein. In alternative embodiments, hardware, such as ASIC 1320, may be used in place of or in combination with software to implement the invention. Thus, embodiments of the invention are not limited to any specific combination of hardware and software, unless otherwise explicitly stated herein.

The signals transmitted over network link 1378 and other networks through communications interface 1370, carry information to and from computer system 1300. Computer system 1300 can send and receive information, including program code, through the networks 1380, 1390 among others, through network link 1378 and communications interface 1370. In an example using the Internet 1390, a server host 1392 transmits program code for a particular application, requested by a message sent from computer 1300, through Internet 1390, ISP equipment 1384, local network 1380 and communications interface 1370. The received code may be executed by processor 1302 as it is received, or may be stored in memory 1304 or in storage device 1308 or any other non-volatile storage for later execution, or both. In this manner, computer system 1300 may obtain application program code in the form of signals on a carrier wave.

Various forms of computer readable media may be involved in carrying one or more sequence of instructions or data or both to processor 1302 for execution. For example, instructions and data may initially be carried on a magnetic disk of a remote computer such as host 1382. The remote computer loads the instructions and data into its dynamic memory and sends the instructions and data over a telephone line using a modem. A modem local to the computer system 1300 receives the instructions and data on a telephone line and uses an infra-red transmitter to convert the instructions and data to a signal on an infra-red carrier wave serving as the network link 1378. An infrared detector serving as communications interface 1370 receives the instructions and data carried in the infrared signal and places information representing the instructions and data onto bus 1310. Bus 1310 carries the information to memory 1304 from which processor 1302 retrieves and executes the instructions using some of the data sent with the instructions. The instructions and data received in memory 1304 may optionally be stored on storage device 1308, either before or after execution by the processor 1302.

FIG. 14 illustrates a chip set or chip 1400 upon which an embodiment of the invention may be implemented. Chip set 1400 is programmed to providing a drawer-based user interface for content access or recommendation as described herein and includes, for instance, the processor and memory components described with respect to FIG. 13 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1400 can be implemented in a single chip. It is further contemplated that in certain embodiments the chip set or chip 1400 can be implemented as a single "system on a chip." It is further contemplated that in certain embodiments a separate ASIC would not be used, for example, and that all relevant functions as disclosed herein would be performed by a processor or processors. Chip set or chip 1400, or a portion thereof, constitutes a means for performing one or more steps of providing user interface navigation information associated with the availability of functions. Chip set or chip 1400, or a portion thereof, constitutes a means for performing one or more steps of providing a drawer-based user interface for content access or recommendation.

In one embodiment, the chip set or chip 1400 includes a communication mechanism such as a bus 1401 for passing information among the components of the chip set 1400. A processor 1403 has connectivity to the bus 1401 to execute instructions and process information stored in, for example, a memory 1405. The processor 1403 may include one or more processing cores with each core configured to perform independently. A multi-core processor enables multiprocessing within a single physical package. Examples of a multi-core processor include two, four, eight, or greater numbers of processing cores. Alternatively or in addition, the processor 1403 may include one or more microprocessors configured in tandem via the bus 1401 to enable independent execution of instructions, pipelining, and multithreading. The processor 1403 may also be accompanied with one or more specialized components to perform certain processing functions and tasks such as one or more digital signal processors (DSP) 1407, or one or more application-specific integrated circuits (ASIC) 1409. A DSP 1407 typically is configured to process real-world signals (e.g., sound) in real time independently of the processor 1403. Similarly, an ASIC 1409 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1400 includes merely one or more processors and some software and/or firmware supporting and/or relating to and/or for the one or more processors.

The processor 1403 and accompanying components have connectivity to the memory 1405 via the bus 1401. The memory 1405 includes both dynamic memory (e.g., RAM, magnetic disk, writable optical disk, etc.) and static memory (e.g., ROM, CD-ROM, etc.) for storing executable instructions that when executed perform the inventive steps described herein to providing a drawer-based user interface for content access or recommendation. The memory 1405 also stores the data associated with or generated by the execution of the inventive steps.

FIG. 15 is a diagram of exemplary components of a mobile terminal (e.g., handset) for communications, which is capable of operating in the system of FIG. 1, according to one embodiment. In some embodiments, mobile terminal 1501, or a portion thereof, constitutes a means for performing one or more steps of providing a drawer-based user interface for content access or recommendation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1503, a Digital Signal Processor (DSP) 1505, and a receiver/transmitter unit including a microphone gain control unit and a speaker gain control unit. A main display unit 1507 provides a display to the user in support of various applications and mobile terminal functions that perform or support the steps of providing a drawer-based user interface for content access or recommendation. The display 1507 includes display circuitry configured to display at least a portion of a user interface of the mobile terminal (e.g., mobile telephone). Additionally, the display 1507 and display circuitry are configured to facilitate user control of at least some functions of the mobile terminal. An audio function circuitry 1509 includes a microphone 1511 and microphone amplifier that amplifies the speech signal output from the microphone 1511. The amplified speech signal output from the microphone 1511 is fed to a coder/decoder (CODEC) 1513.

A radio section 1515 amplifies power and converts frequency in order to communicate with a base station, which is included in a mobile communication system, via antenna 1517. The power amplifier (PA) 1519 and the transmitter/modulation circuitry are operationally responsive to the MCU 1503, with an output from the PA 1519 coupled to the duplexer 1521 or circulator or antenna switch, as known in the art. The PA 1519 also couples to a battery interface and power control unit 1520.

In use, a user of mobile terminal 1501 speaks into the microphone 1511 and his or her voice along with any detected background noise is converted into an analog voltage. The analog voltage is then converted into a digital signal through the Analog to Digital Converter (ADC) 1523. The control unit 1503 routes the digital signal into the DSP 1505 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1525 for compensation of any frequency-dependent impairments that occur during transmission though the air such as phase and amplitude distortion. After equalizing the bit stream, the modulator 1527 combines the signal with a RF signal generated in the RF interface 1529. The modulator 1527 generates a sine wave by way of frequency or phase modulation. In order to prepare the signal for transmission, an up-converter 1531 combines the sine wave output from the modulator 1527 with another sine wave generated by a synthesizer 1533 to achieve the desired frequency of transmission. The signal is then sent through a PA 1519 to increase the signal to an appropriate power level. In practical systems, the PA 1519 acts as a variable gain amplifier whose gain is controlled by the DSP 1505 from information received from a network base station. The signal is then filtered within the duplexer 1521 and optionally sent to an antenna coupler 1535 to match impedances to provide maximum power transfer. Finally, the signal is transmitted via antenna 1517 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1501 are received via antenna 1517 and immediately amplified by a low noise amplifier (LNA) 1537. A down-converter 1539 lowers the carrier frequency while the demodulator 1541 strips away the RF leaving only a digital bit stream. The signal then goes through the equalizer 1525 and is processed by the DSP 1505. A Digital to Analog Converter (DAC) 1543 converts the signal and the resulting output is transmitted to the user through the speaker 1545, all under control of a Main Control Unit (MCU) 1503 which can be implemented as a Central Processing Unit (CPU).

The MCU 1503 receives various signals including input signals from the keyboard 1547. The keyboard 1547 and/or the MCU 1503 in combination with other user input components (e.g., the microphone 1511) comprise a user interface circuitry for managing user input. The MCU 1503 runs user interface software to facilitate user control of at least some functions of the mobile terminal 1501 to providing a drawer-based user interface for content access or recommendation. The MCU 1503 also delivers a display command and a switch command to the display 1507 and to the speech output switching controller, respectively. Further, the MCU 1503 exchanges information with the DSP 1505 and can access an optionally incorporated SIM card 1549 and a memory 1551. In addition, the MCU 1503 executes various control functions required of the terminal. The DSP 1505 may, depending upon the implementation, perform any of a variety of conventional digital processing functions on the voice signals. Additionally, DSP 1505 determines the background noise level of the local environment from the signals detected by microphone 1511 and sets the gain of microphone 1511 to a level selected to compensate for the natural tendency of the user of the mobile terminal 1501.

The CODEC 1513 includes the ADC 1523 and DAC 1543. The memory 1551 stores various data including call incoming tone data and is capable of storing other data including music data received via, e.g., the global Internet. The software module could reside in RAM memory, flash memory, registers, or any other form of writable storage medium known in the art. The memory device 1551 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1549 carries, for instance, important information, such as the cellular phone number, the carrier supplying service, subscription details, and security information. The SIM card 1549 serves primarily to identify the mobile terminal 1501 on a radio network. The card 1549 also contains a memory for storing a personal telephone number registry, text messages, and user specific mobile terminal settings.

Further, one or more camera sensors 1553 may be incorporated onto the mobile station 1501 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   generating, by an apparatus, at least one representation of at least one building at a user interface of a first user device, wherein one or more floors of the at least one building are represented as inserted with one or more drawer user interface elements in the at least one representation;
   associating, by the apparatus, one or more content items currently being played at one or more second user devices with the one or more drawer user interface elements; and
   in response to a detection of one or more user interactions with the one or more drawer user interface elements, generating, by the apparatus, a presentation of the one or more drawer user interface elements being slidden out of the at least one building as opened concurrently with an initiation of one or more operations on the one or more content items, wherein the one or more operations include playing at the first device the one or more content items currently being played at the one or more second user devices.

2. The method of claim 1, further comprising:
   generating a presentation of one or more drawer adapter user interface elements with at least one representation of at least one building on the second user device,
   wherein the one or more drawer adapter user interface elements enable a configuration of the one or more drawer user interface elements within the at least one building, a drawer interaction among the one or more drawer user interface elements, or a combination thereof, and
   wherein the one or more content items being played currently at first device and the one or more second user devices are created live at the one or more second user devices.

3. The method of claim 1, wherein the configuration, the drawer interaction, or a combination thereof are associated with (1) creating a playback order for the one or more content items, (2) determining one or more transitions between a playback of the one or more content items, (3) determining a parametric evolution for a playback of the one or more content items, (4) causing a union of the one or more content items, (5) determining an intersection of the one or more content items, (6) causing a selection of the one or more content items based, at least in part, on a stylistic criterion, (7) causing an arrangement of the one or more content items based, at least in part, on a stylistic criterion, or a (8) combination thereof, wherein the one or more content items are created live by providing one or more live camera views, capturing one or more live images, creating one or more new playlists, generating one or more live media content items, or a combination thereof, at the one or more second user devices.

4. The method of claim 1, further comprising:
in response to a detection of other user interactions with two or more of the drawer user interface elements, concurrently generating (1) a presentation of content items associated with the two or more drawer user interface elements as within each of the drawer user interface elements while the two or more drawer user interface elements being concurrently slidden out of the at least one building, and (2) an operation of mixing and playing at the first device the content items associated with the two or more drawer user interface elements, generating at the first device a playlist based on the content items associated with the two or more drawer user interface elements, or a combination thereof.

5. The method of claim 1, further comprising:
determining that the one or more user interactions is associated with a moving of the one or more drawer user interface elements (1) within the at least one representation, (2) between the at least one representation and at least one other representation of at least one other building, or (3) a combination thereof; and
rearranging the one or more content items based, at least in part, on the one or more user interactions, and
wherein the one or more operations include making one or more recommendations of one or more other content items based, at least in part, on the one or more content items played at the one or more second user devices.

6. The method of claim 1, wherein the one or more content items are played at the one or more second user devices physically located on one or more real world floors corresponding to the one or more floors inserted with the one or more drawer user interface elements.

7. The method of claim 1, further comprising:
determining that the one or more user interactions is for specifying one or more other content items to add to the one or more drawer user interface elements; and
generating a recommendation of the one or more other items to one or more users associated with the one or more floors represented by the one or more drawer user interface elements.

8. The method of claim 1, further comprising:
determining that the one or more user interactions is for causing, at least in part, a modification of one or more appearance characteristics of the at least one drawer user interface element; and
determining the one or more operations to initiate on the one or more content items based, at least in part, on the modification.

9. The method of claim 1, further comprising:
determining one or more outlines, one or more textures, or a combination thereof of the at least one representation based, at least in part, on the one or more user interactions, the one or more operations, or a combination thereof, wherein the one or more user interactions include sliding the one or more drawer user interface elements out of the at least one building.

10. The method of claim 1, wherein the apparatus is embedded in a user mobile device, and the at least one representation of the at least one building includes, at least in part, a building frame and one or more sponsor indicators posted on one or more of the drawer user interface elements at the first user device, and the one or more drawer user interface elements posted with one or more sponsor indicators offer one or more free content items for access.

11. The method of claim 1, wherein the at least one building including first, second, and third buildings, and the method further comprising:
in response to a detection of user interactions with a first drawer user interface element of the first building, a second drawer user interface element of the second building, and a floor of the third building, concurrently generating (1) a presentation of content items associated with the first and second drawer user interface elements as within each of the drawer user interface elements while the first and second drawer user interface elements being concurrently slidden out of the respective building and slidden into the floor of the third building, and (2) an operation of mixing and playing at the first device the content items associated with the first and second drawer user interface elements.

12. An apparatus comprising:
at least one processor; and
at least one memory including computer program code for one or more programs,
the at least one memory and the computer program code configured to, with the at least one processor, cause the apparatus to perform at least the following,
generate at least one representation of at least one building at a user interface of a first user device, wherein one or more floors of the at least one building are represented as inserted with one or more drawer user interface elements in the at least one representation;
associate one or more content items currently being played at one or more second user devices with the one or more drawer user interface elements; and
in response to a detection of one or more user interactions with the one or more drawer user interface elements, generate a presentation of the one or more drawer user interface elements being slidden out of the at least one building as opened concurrently with an initiation of one or more operations on the one or more content items, wherein the one or more operations include playing at the first device the one or more content items currently being played at the one or more second user devices.

13. The apparatus of claim 12, wherein the apparatus is further caused to:
generate a presentation of one or more drawer adapter user interface elements with the at least one representation of the at least one building,
wherein the one or more drawer adapter user interface elements enable a configuration of the one or more drawer user interface elements within the at least one building, a drawer interaction among the one or more drawer user interface elements, or a combination thereof.

14. The apparatus of claim 13, wherein the configuration, the drawer interaction, or a combination thereof are associated with (1) creating a playback order for the one or more content items, (2) determining one or more transitions between a playback of the one or more content items, (3) determining a parametric evolution for a playback of the one or more content items, (4) causing a union of the one or more content items, (5) determining an intersection of the one or more content items, (6) causing a selection of the one or more content items based, at least in part, on a stylistic criterion, (7) causing an arrangement of the one or more content items based, at least in part, on a stylistic criterion, or a (8) combination thereof.

15. The apparatus of claim 12, wherein the apparatus is further caused to:
   determine that the one or more user interactions is associated with an opening of the one or more drawer user interface elements; and
   generate a presentation of one or more other representations of the one or more content items associated with the opened one or more drawer user interface elements.

16. The apparatus of claim 12, wherein the apparatus is further caused to:
   determine that the one or more user interactions is associated with a moving of the one or more drawer user interface elements (1) within the at least one representation, (2) between the at least one representation and at least one other representation of at least one other building, or (3) a combination thereof; and
   rearrange the one or more content items based, at least in part, on the one or more user interactions.

17. The apparatus of claim 12, wherein the one or more content items are the one or more content items consumed by one or more users associated with the one or more floors represented by the one or more drawer user interface elements.

18. The apparatus of claim 12, wherein the apparatus is further caused to:
   determine that the one or more user interactions is for specifying one or more other content items to add to the one or more drawer user interface elements; and
   generate a recommendation of the one or more other items to one or more users associated with the one or more floors represented by the one or more drawer user interface elements.

19. The apparatus of claim 12, wherein the apparatus is further caused to:
   determine that the one or more user interactions is for causing, at least in part, a modification of one or more appearance characteristics of the at least one drawer user interface element; and
   determine the one or more operations to initiate on the one or more content items based, at least in part, on the modification.

20. The apparatus of claim 12, wherein the apparatus is further caused to:
   determine one or more outlines, one or more textures, or a combination thereof of the at least one representation based, at least in part, on the one or more user interactions, the one or more operations, or a combination thereof.

* * * * *